(12) United States Patent
Arnold et al.

(10) Patent No.: US 12,016,467 B2
(45) Date of Patent: Jun. 25, 2024

(54) CONFIGURABLE STACKING CHAIRS WITH QUICK-CONNECT INTERCHANGEABLE BACKS

(71) Applicant: Inventive Furniture, LLC, Denver, CO (US)

(72) Inventors: Kien Arnold, Denver, CO (US); Michael Gunter, Castle Rock, CO (US); Shery McDonald, Denver, CO (US); Ann Motokane, Parker, CO (US)

(73) Assignee: Inventive Furniture, LLC, Denver, CO (US)

( * ) Notice: Subject to any disclaimer, the term of this patent is extended or adjusted under 35 U.S.C. 154(b) by 0 days.

(21) Appl. No.: 18/212,361

(22) Filed: Jun. 21, 2023

(65) Prior Publication Data
US 2023/0329438 A1 Oct. 19, 2023

Related U.S. Application Data

(63) Continuation of application No. 17/348,507, filed on Jun. 15, 2021, now Pat. No. 11,723,468.

(60) Provisional application No. 63/040,170, filed on Jun. 17, 2020.

(51) Int. Cl.
*A47C 4/02* (2006.01)
*A47C 3/04* (2006.01)
(Continued)

(52) U.S. Cl.
CPC ............... *A47C 4/02* (2013.01); *A47C 3/04* (2013.01); *A47C 4/03* (2013.01); *A47C 7/0213* (2018.08);
(Continued)

(58) Field of Classification Search
CPC .... A47C 4/02; A47C 3/04; A47C 4/03; A47C 7/0213; A47C 7/42; A47C 13/005; F16B 12/36; F16B 12/40

USPC ...... 297/219.1, 239, 440.14, 440.15, 440.16, 297/440.2, 440.21, 283.3, 446.1, 521.11, 297/452.48

See application file for complete search history.

(56) References Cited

U.S. PATENT DOCUMENTS

| | | | |
|---|---|---|---|
| 3,727,981 | A | 4/1973 | Orstroff et al. |
| 4,140,065 | A | 2/1979 | Chacon |

(Continued)

FOREIGN PATENT DOCUMENTS

| | | |
|---|---|---|
| GB | 2366996 | 3/2002 |

OTHER PUBLICATIONS

Notice of Allowance for U.S. Appl. No. 17/348,507, dated Mar. 28, 2023, 9 pages.

*Primary Examiner* — Robert Canfield
(74) *Attorney, Agent, or Firm* — Sheridan Ross P.C.

(57) ABSTRACT

The present disclosure relates to configurable stacking chairs having a standard seat base frame design to which different interchangeable seat backs can be quickly and easily attached. The seat base frames and the interchangeable seat backs may include corresponding quick-connect features that allow selective attachment therebetween. The interchangeable seat backs may be attached to a standard seat base frame via a magnetic connection. Each interchangeable seat back can have a different unique design allowing for a quick change of appearance by exchanging one interchangeable seat back design for another. The interchangeable seat backs and the standard seat base frames can be stored separately and take up less space than completely assembled or fixed back chairs.

20 Claims, 11 Drawing Sheets

(51) Int. Cl.
- *A47C 4/03* (2006.01)
- *A47C 7/02* (2006.01)
- *A47C 7/42* (2006.01)
- *A47C 13/00* (2006.01)
- *F16B 1/00* (2006.01)
- *F16B 12/36* (2006.01)
- *F16B 12/40* (2006.01)
- *F16B 12/10* (2006.01)

(52) U.S. Cl.
CPC .............. *A47C 7/42* (2013.01); *A47C 13/005* (2013.01); *F16B 1/00* (2013.01); *F16B 12/36* (2013.01); *F16B 12/40* (2013.01); *F16B 2012/103* (2013.01); *F16B 2012/106* (2013.01); *F16B 2012/403* (2013.01); *F16B 2200/83* (2023.08)

(56) References Cited

U.S. PATENT DOCUMENTS

| | | | |
|---|---|---|---|
| 4,974,906 | A | 12/1990 | Hines |
| 5,074,621 | A | 12/1991 | McDonald |
| 5,123,702 | A | 6/1992 | Caruso |
| 5,184,871 | A | 2/1993 | Lapointe et al. |
| 5,727,849 | A | 3/1998 | Nelson |
| 6,109,695 | A | 8/2000 | Kahwaji |
| 6,135,562 | A | 10/2000 | Infanti |
| D441,575 | S | 5/2001 | Ambrosio |
| 6,837,542 | B2 | 1/2005 | Barile, Jr. et al. |
| 7,404,607 | B2 | 7/2008 | Crue |
| 7,740,320 | B2 | 6/2010 | Chiang |
| 8,047,607 | B1 | 11/2011 | Shokouhi et al. |
| 8,112,868 | B2 | 2/2012 | Miller |
| 8,454,088 | B2 | 6/2013 | Shokouihi |
| D696,037 | S | 12/2013 | Shokouihi |
| 9,527,519 | B1 | 12/2016 | Shokouihi |
| 11,464,339 | B2 | 10/2022 | Milberg et al. |
| 11,723,468 | B2 | 8/2023 | Arnold et al. |
| 2003/0052524 | A1 | 3/2003 | Chiang |
| 2004/0026980 | A1 | 2/2004 | Tseng |
| 2005/0099052 | A1 | 5/2005 | Bertolini et al. |
| 2005/0151409 | A1 | 7/2005 | Infanti et al. |
| 2010/0109414 | A1 | 5/2010 | Chiang |
| 2012/0119629 | A1 | 5/2012 | Nelson et al. |
| 2012/0153588 | A1 | 6/2012 | Shokouihi |
| 2016/0174715 | A1 | 6/2016 | Nelson et al. |
| 2017/0071354 | A1 | 3/2017 | Mezzera |
| 2017/0119158 | A1 | 5/2017 | Pectol et al. |
| 2022/0047082 | A1 | 2/2022 | Andersson et al. |
| 2022/0369815 | A1 | 11/2022 | Bock et al. |

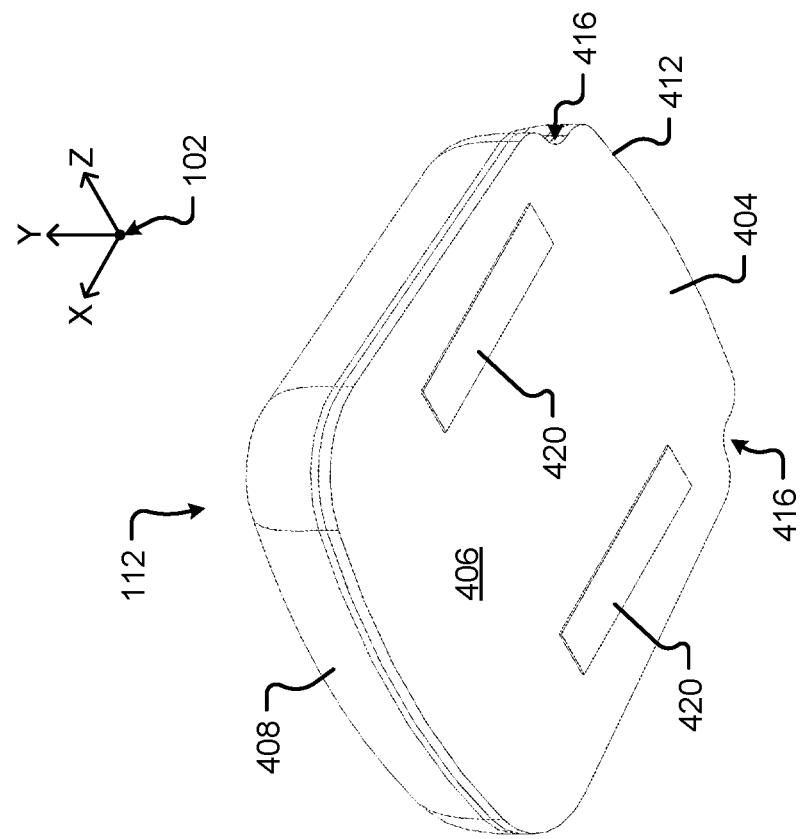
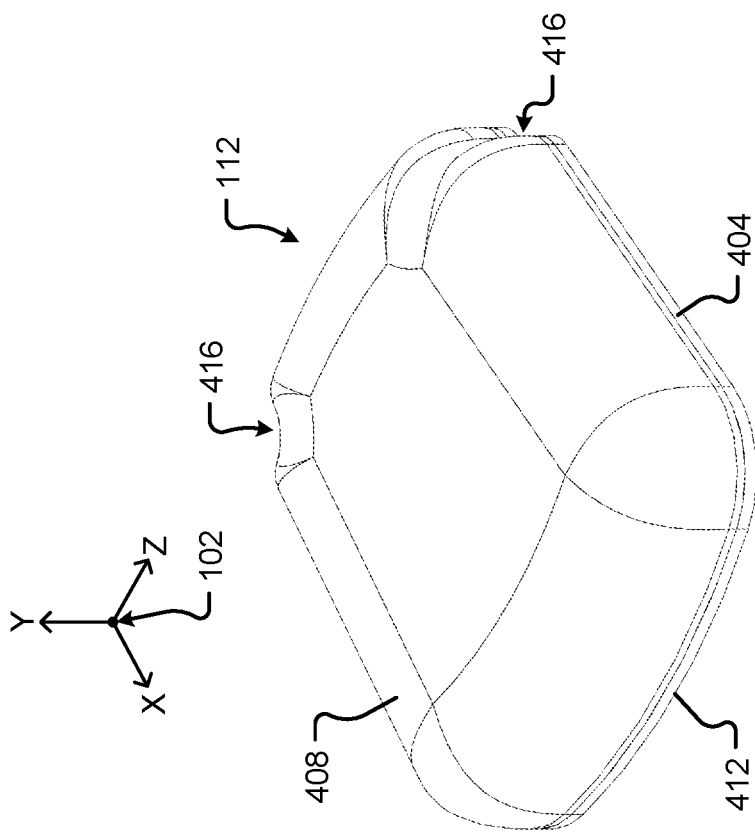
FIG. 4B
FIG. 4A

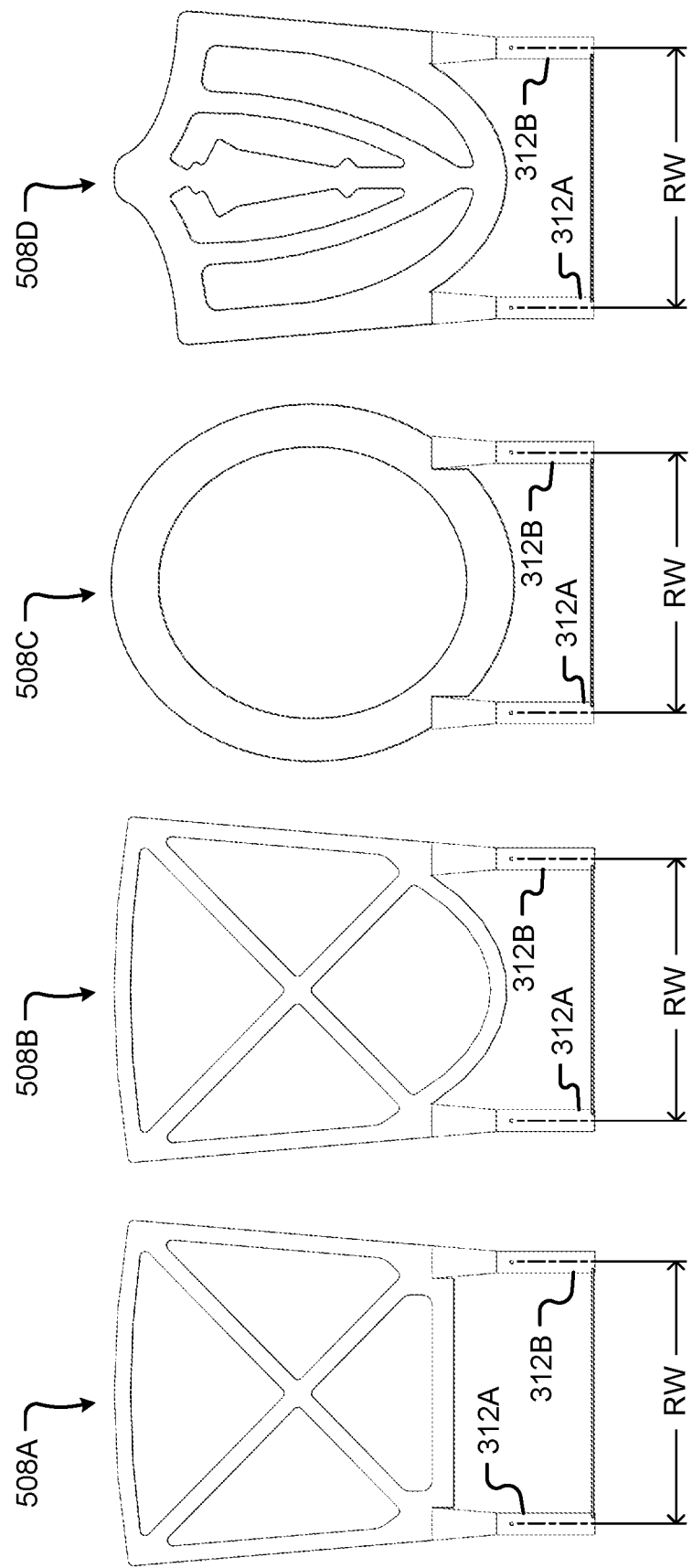

CONFIGURABLE STACKING CHAIRS WITH QUICK-CONNECT INTERCHANGEABLE BACKS

CROSS-REFERENCE TO RELATED APPLICATIONS

The present application is a continuation of U.S. patent application Ser. No. 17/348,507, filed on Jun. 15, 2021, entitled "Configurable Stacking Chairs with Quick-Connect Interchangeable Backs," which claims the benefit of and priority, under 35 U.S.C. § 119(e), to U.S. Provisional Application Ser. No. 63/040,170, filed on Jun. 17, 2020, entitled "Configurable Stacking Chairs with Quick-Connect Interchangeable Backs," the entire disclosures of which are hereby incorporated herein by reference, in their entireties, for all that they teach and for all purposes.

BACKGROUND

The present disclosure is generally directed to stacking chairs and, in particular, toward stacking chairs having swappable and interchangeable features.

Stacking and folding chairs have long been employed by event hosts and organizers to provide a flexible option for seating at a venue. When not in use, these chairs can be compactly stored and only deployed as needed. In general, however, the aesthetic of conventional stacking and folding chairs is limited to a fixed-design per chair.

Event planners carefully select the design of a chair to suit a particular event or occasion. For instance, an ornate chair design may be appropriate for a formal celebratory event (e.g., a wedding, birthday party, or graduation, etc.) but may be considered inappropriate for a more solemn event (e.g., a press briefing, funeral, or wake, etc.). In addition, a simple chair may be suitable for a solemn event but appear out of place or even unsightly at a formal celebratory event. This issue requires event hosts and/or event rental companies to track, store, and stock a large number of different chair designs to accommodate any occasion. As can be appreciated, stocking a large number of different fixed-design chairs requires significant warehouse space, organization, and logistics.

Others have attempted to solve this problem by offering a single simple fixed-design chair with removeable/exchangeable slip covers to alter the appearance of the chair. However, this alteration is limited to the colors, textures, and/or patterns of the slip covers available. Moreover, slip covers inherently hide the structure of the chair and, as such, the general aesthetic and shape of the simple fixed-design chair looks the same regardless of what cover is used.

BRIEF SUMMARY

It is with respect to the above issues and other problems that the embodiments presented herein were contemplated. It is an object the present disclosure to provide a configurable stacking chair having a standard seat base frame design to which different seat backs can be quickly and easily attached. Each seat back can have a different unique design, for example, to suit a particular occasion. In some embodiments, the seat base frames and the seat backs may include corresponding (e.g., mating, complementary, etc.) quick-connect features to facilitate selective attachment therebetween. As can be appreciated, these interchangeable seat backs may be stored apart from the standard seat base frames and take up much less space than an equal number of stored completely assembled chairs or fixed back chairs (e.g., chairs with a seat base and fixed seat back). Additionally or alternatively, the seat base frames may be stored apart from the interchangeable seat backs and take up much less space than an equal number of stored completely assembled chairs or fixed back chairs.

In some embodiments, the interchangeable seat backs may be attached to a seat base frame via a magnetic connection. For instance, the seat base frame and/or the interchangeable seat back may comprise at least one magnet. In one embodiment, a magnet may be disposed in a portion of the interchangeable seat back and the seat base frame may comprise a ferrous (e.g., iron-based, etc.) metal, such as steel, that is attracted (via magnetism) to the magnet. In some embodiments, a magnet may be disposed in a portion of the seat base frame and the interchangeable seat back may comprise the ferrous metal, such as steel, that is attracted (via magnetism) to the magnet. The steel may comprise a magnetic stainless steel, such as the American Iron and Steel Institute ("AISI") grade 420, 630, Society of Automotive Engineering ("SAE") 17-4 PH, etc., and/or the like. However, in some embodiments the steel may comprise a magnetic non-stainless steel. As another example, a magnet may be disposed in a portion of the interchangeable seat back as well as in a portion of the seat base frame. In this example, the magnets may be arranged as opposing poles such that the north pole of a first magnet is configured to mate with the south pole of the mating second magnet.

The polarity of the magnets may be arranged to provide a poka-yoke feature between the interchangeable seat backs and the standard seat base frames. For instance, a first side of the standard seat base frame may include a first polarity of magnet and the other second side may include a second opposite polarity of magnet. Continuing this example, the interchangeable seat back may include a first side that is designed to interconnect with the first side of the standard seat base frame. As such, the first side of the interchangeable seat back may include a magnet having the second opposite polarity and the second side of the interchangeable seat back may include a magnet having the first polarity. In this manner, the interchangeable seat backs may only be installed in the correct orientation (north-south matching polarity on the first side and south-north matching polarity on the second side, etc.). Attempting to install the interchangeable seat back in a reverse condition (e.g., back-to-front, etc.) using this poka-yoke arrangement would result in the polarity of the magnets aligned between the interchangeable seat back and the seat base frame repelling one another and preventing attachment.

In some embodiments, the configurable stacking chair may comprise one or more of a standard seat base frame, an interchangeable seat back, and a detachable seat cushion. Reference may be made herein to a width, length, and/or height of the configurable stacking chair and/or the various components that make up the configurable stacking chair. As used herein, the term "height" may refer to a dimension running along a direction orthogonal to the ground plane, the term "width" may refer to a dimension running along a side-to-side direction parallel to the ground plane, and the term "length" may refer to a dimension running along a front-to-back direction that is orthogonal to the width and parallel to the ground plane. The term "front" may be used herein to refer to the portion of the configurable stacking chair that is opposite the interchangeable seat back when measured in a plane orthogonal to the ground plane. The term "rear" may be used herein to refer to the portion of the configurable stacking chair that is adjacent, or closest, the interchangeable seat back when measured in a plane orthogonal to the ground plane.

The standard seat base frame may comprise a flat platform attached to a reinforcement frame and four legs attached to the reinforcement frame and/or the flat platform. The attachment between the components of the standard seat base frame may be made via one or more welds, bends, fasteners, pins, glued joints, tab-in-slot connections, hook-and-loop connections, tongue-in-groove connections, dovetail joints, etc., and/or combinations thereof. In some embodiments, the flat platform may be welded to the reinforcement frame and the legs may be welded to one or more of the reinforcement frame and/or the platform. The standard seat base frame may correspond to a modular chair assembly that receives and engages with different types or designs of interchangeable seat backs. Stated another way, the terms "standard" or "modular" may be used interchangeably herein and may refer to a type of frame comprising a standardized, or modular, set of features that remain the same (e.g., in common, etc.) from chair to chair and that provide a reliable and repeatable interconnection for one or more interchangeable seat backs with any standard seat base frame.

The flat platform may be arranged as a plate extending in a plane a length and a width. The platform may include a top surface and a bottom surface disposed opposite the top surface. The top surface and the bottom surface may be offset a distance from one another and define a thickness of the plate. In some embodiments, the top surface may be configured to support a detachable seat cushion and the bottom surface may define an underside of the standard seat base frame. The platform may comprise a number of sides running along the length and width of the plate. The intersection of two sides of the plate may define the corners of the platform. In one embodiment, the platform may comprise at least four corners disposed at outermost points of the plate. In some embodiments, the platform may comprise a number of cutouts, or apertures, disposed through the plate. These cutouts may provide features to engage with a mating detachable seat cushion, reduce an amount of material used for the platform, and/or decrease an overall weight of the platform, etc.

The reinforcement frame may comprise a number of bars that are interconnected with one another and that attach to the platform. The bars may comprise one or more of angle, tubing, channel, plate, and/or any other structural member joined together to form a frame upon which the platform may attach and be supported. In some embodiments, the bars may comprise at least one metal that has been extruded, molded, welded together, shaped, or otherwise formed. These metal bars may be welded together to form the reinforcement frame of the standard seat base frame. In one embodiment, the reinforcement frame may comprise a rectangular outer periphery with a single bar extending from one side bar of the rectangle to an opposing side bar of the rectangle. The single bar may run from the middle of one side bar of the rectangle to the middle of the opposing side bar of the rectangle. In some embodiments, the bars may be oriented orthogonally and parallel to one another. For instance, opposing side bars of the rectangle may be arranged parallel to one another while adjacent side bars of the rectangle may be arranged orthogonal to one another. The single bar may be arranged orthogonal to the two opposing side bars to which the single bar is connected.

The standard seat base frame may include four legs that attach to the reinforcement frame and/or the platform. For instance, the four legs may be separated into a set of two front legs and a set of two rear legs. The set of front legs may be arranged in a same plane offset by a front leg separation width (that runs in a width direction of the configurable stacking chair and the detachable seat cushion). The set of front legs may be disposed on, and attached to, an outside of the reinforcement frame adjacent to opposing corners of the front of the reinforcement frame. At least a portion of the set of rear legs may be arranged in a same plane offset by a rear leg separation width (that runs in the width direction of the configurable stacking chair and the detachable seat cushion). The rear leg separation width may be smaller than the front leg separation width, the same size as the front leg separation width, or greater than the front leg separation width. The set of rear legs may be disposed on, and attached to, an outside of the reinforcement frame adjacent to opposing corners of the back of the reinforcement frame. In some embodiments, the front set of legs may be welded to the front bar of the reinforcement frame while the rear set of legs may be welded to the rear bar of the reinforcement frame. In one embodiment, the front set of legs may be welded to the front bar and respective side bars of the reinforcement frame while the rear set of legs may be welded to the rear bar and the respective side bars of the reinforcement frame. The platform may be welded to one or more of the legs. Additionally or alternatively, the platform may be arranged and shaped to cover a top of the front set of legs.

In some embodiments, the standard seat base frame comprises two dowels, or axles, that extend a distance from the top of the rear legs. These dowels may be arranged as a cylindrical member that fits inside an inner diameter of the rear legs. Each dowel may be welded, press fit, interference fit, adhered, fastened, or otherwise attached to a respective rear leg of the set of rear legs. In one embodiment, the dowels may include a broken, chamfered, filleted, or otherwise tapered uppermost edge. This tapered uppermost edge may provide assembly guidance when attaching corresponding receptacle features of the interchangeable seat back with the dowels. As provided above, the dowels may be made from a ferrous metal (e.g., a magnetic metal) such as steel. Additionally or alternatively, the dowels may include a magnet disposed in a portion thereof. In one embodiment, the magnet may be disposed at the uppermost surface of each dowel. Although described as a separate component, it should be appreciated that the dowel may be a part of the rear legs formed with features to engage with the interchangeable seat back.

The interchangeable seat back may comprise a pair of dowel engagement tubes that form uprights of the interchangeable seat back and interconnect with the dowels in the standard seat base frame. The inner diameters of the dowel engagement tubes may be sized as a slip, or clearance, fit with the dowels of the standard seat base frame. The dowel engagement tubes may attach to a back panel of the interchangeable seat back. In some embodiments, this attachment may correspond to a formed, welded, fastened, glued, or other rigid interconnection between the back panel and the dowel engagement tubes. In one embodiment, the dowel engagement tubes may include a magnet disposed in an internal space of each of the dowel engagement tubes. The magnet disposed in the internal space of each of the dowel engagement tubes may be at least partially surrounded by a tapered guide. This tapered guide may be arranged to have the same taper as the uppermost edge of the dowel. For example, however, rather than a chamfered external edge, the tapered guide may correspond to a chamfered internal edge (e.g., of a receptacle). The chamfered internal edge provides a guide and a receptacle for guiding and receiving the uppermost edge of the dowel. Among other things, this matching taper may positively locate the end of the dowel preventing wobble, or axial tilt, of the interchangeable seat back relative to the standard seat base frame.

Prior to attachment, the dowel engagement tubes of the interchangeable seat back are aligned with the dowels of the standard seat base frame such that the axis of each dowel is aligned, or colinear, with the axis of each respective dowel engagement tube. Next, while maintaining this alignment, the interchangeable seat back and the standard seat base frame are moved closer to one another until each dowel inserts into the internal space of a respective dowel engagement tube. When the dowel is in magnetic range of the magnet disposed inside the internal space of the respective dowel engagement tube, the interchangeable seat back and the standard seat base frame are held axially in place by the magnets. In addition, the cylindrical interface between the dowels and the dowel engagement tubes prevents movement of the interchangeable seat back relative to the standard seat base frame in the width direction and the length direction of the configurable stacking chair.

The detachable seat cushion may comprise a foam seat pad attached to a seat pad base. The seat pad base may correspond to a rigid structure, member, or plate that interconnects with the platform of the standard seat base frame. In one embodiment, the seat pad base may be made from plastic, metal, wood, composite, recycled material, recyclable material, and/or any other material formed into a rigid substrate. The detachable seat cushion may be attached to the platform of the standard seat base frame via one or more of hook-and-loop fasteners, tab-and-slot construction, adhesive, quarter-turn fasteners, and/or any other selectively releasable fastening system. In some embodiments, the platform of the standard seat base frame may comprise one or more strips of a hook-and-loop fastening material. The bottom surface of the seat pad base may comprise a corresponding mating one or more strips of the hook-and-loop fastening material. For example, the platform may comprise at least one strip of the "loop" portion of the hook-and-loop fastening material and the bottom of the seat pad base may comprise at least one strip of the "hook" portion of the hook-and-loop fastening material, or vice versa. It is an aspect of the present disclosure that the "loop" fastening material be adhered and/or otherwise attached to the platform because during stacking, the "loop" material may be less susceptible to damage than the "hook" material. In this case, the "hook" material may be adhered, stapled, or otherwise attached to the bottom surface of the seat pad base. These "hook" material of the hook-and-loop fastening material interface may be preserved as the detachable seat cushions may be stored in various orientations (e.g., vertically, side-by-side, etc.) and the detachable seat cushions weigh substantially less than the standard seat base frames.

As can be appreciated, the configurable stacking chair may be separated into the standard seat base frame, the interchangeable seat back, and the detachable seat cushion for storage, transport, and/or staging (e.g., before setting up at a venue or event, etc.). The configurable stacking chair may be stacked, one on top of another, in the height direction, the interchangeable seat backs may be nested together (e.g., in a front-to-back arrangement), and the detachable seat cushions may be stacked such that the seat pad base of a first detachable seat cushion contacts the foam seat pad of another detachable seat cushion, and so on. These stacked detachable seat cushions may be stored as a vertical stack (e.g., extending along the height direction) or as a horizontal stack (e.g., extending along a width and/or length direction).

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

Numerous additional features and advantages are described herein and will be apparent to those skilled in the art upon consideration of the following Detailed Description and in view of the figures.

BRIEF DESCRIPTION OF THE SEVERAL VIEWS OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

FIG. 4A is a top perspective view of the detachable seat cushion of the configurable stacking chair in accordance with embodiments of the present disclosure;

FIG. 4B is a bottom perspective view of the detachable seat cushion of the configurable stacking chair in accordance with embodiments of the present disclosure;

FIG. 5A is a front elevation view of a first interchangeable seat back in accordance with embodiments of the present disclosure;

FIG. 5B is a front elevation view of a second interchangeable seat back in accordance with embodiments of the present disclosure;

FIG. 5C is a front elevation view of a third interchangeable seat back in accordance with embodiments of the present disclosure;

FIG. 5D is a front elevation view of a fourth interchangeable seat back in accordance with embodiments of the present disclosure;

DETAILED DESCRIPTION

Figure 1A:
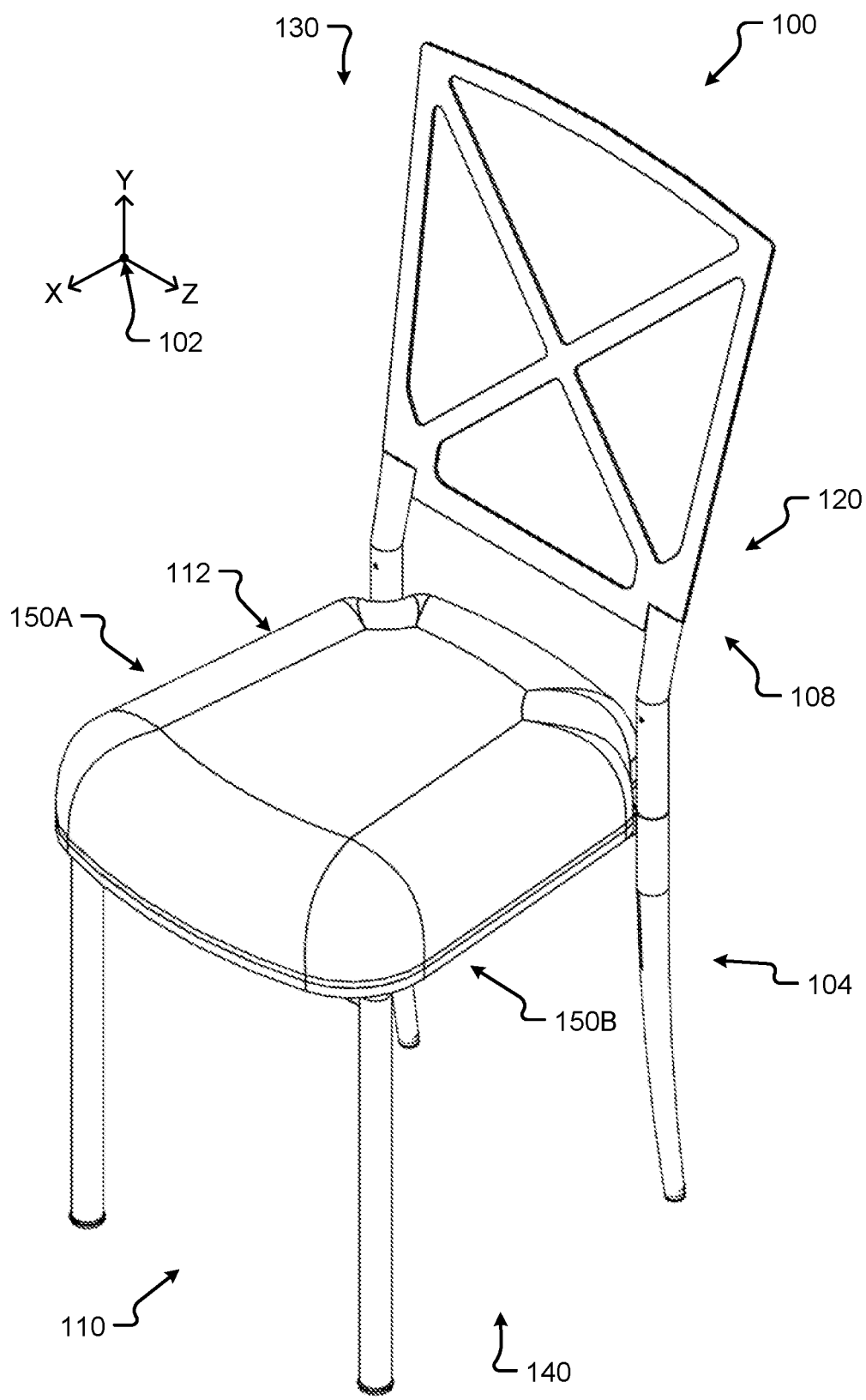
FIG. 1A is a perspective view of an assembled configurable stacking chair in accordance with embodiments of the present disclosure.

Before any embodiments of the disclosure are explained in detail, it is to be understood that the disclosure is not limited in its application to the details of construction and the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, the present disclosure may use examples to illustrate one or more aspects thereof. Unless explicitly stated otherwise, the use or listing of one or more examples (which may be denoted by "for example," "by way of example," "e.g.," "such as," or similar language) is not intended to and does not limit the scope of the present disclosure.

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

Various aspects of the present disclosure will be described herein with reference to drawings that may be schematic illustrations of idealized configurations.

Figure 1B:
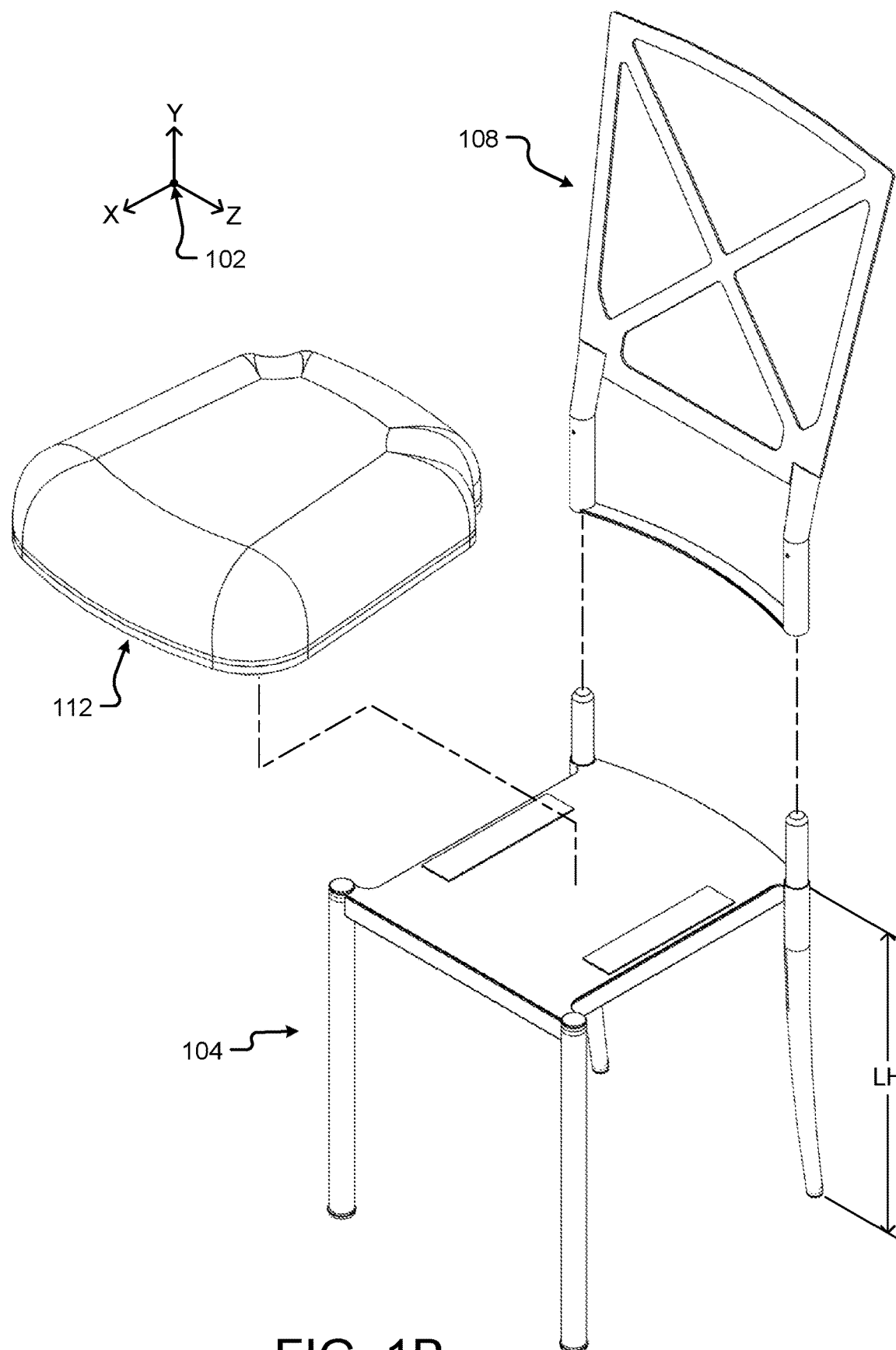
FIG. 1B is an exploded perspective view of the configurable stacking chair shown in FIG. 1A.

Referring to FIGS. 1A-1B perspective views of a configurable stacking chair 100 are shown in accordance with embodiments of the present disclosure. The configurable stacking chair 100 comprises a modular seat base frame 104, an interchangeable seat back 108, and a detachable seat cushion 112. is a perspective view of an assembled configurable stacking chair in accordance with embodiments of the present disclosure;

Features of the configurable stacking chair 100 may be described in conjunction with the coordinate system 102 illustrated. For example, the width of the configurable stacking chair 100 may be defined as a dimension along the Z-axis, the height of the configurable stacking chair 100 may be defined as dimension along the Y-axis, and the length (or depth) of the configurable stacking chair 100 may be defined as a dimension along the X-axis of the coordinate system 102. Additionally or alternatively, the width of various components making up the configurable stacking chair 100 may be defined as a dimension along the Z-axis, the height of the various components making up the configurable stacking chair 100 may be defined as dimension along the Y-axis, and the length, or depth, of the various components making up the configurable stacking chair 100 may be defined as a dimension along the X-axis of the coordinate system 102.

In some embodiments, reference may be made to a front side 110, a rear side 120, a top side 130, a bottom side 140, a first side 150A, and a second side 150B, of the configurable stacking chair 100 and/or the components of the configurable stacking chair 100. The first side 150A may be referred to herein as the right-hand side of the configurable stacking chair 100 and the second side 150B may be referred to herein as the left-hand side of the configurable stacking chair 100. In this example, a respective side 150A-150B of the configurable stacking chair 100 may correspond to a side of a person sitting in the chair with their back against the interchangeable seat back 108.

As illustrated in FIG. 1B, the configurable stacking chair 100 may be disassembled into two or more subassemblies. For instance, the configurable stacking chair 100 shown in FIG. 1B is shown separated into the modular seat base frame 104, the interchangeable seat back 108, and the detachable seat cushion 112. In some embodiments, these subassemblies may be stacked and/or stored separately from one another. Although a leg height, LH, is shown associated with a rear leg of the configurable stacking chair 100, it should be appreciated that each leg may extend the leg height, LH, from a first end to a second end.

FIGS. 2A-2E show various views of the modular seat base frame 104 of the configurable stacking chair 100 in accordance with embodiments of the present disclosure. In one embodiment, the modular seat base frame 104 may comprise a seat platform 204, a reinforcement frame 208 attached to the seat platform 204, two or more legs 212A-212B, 214A-214B, one or more quick-connect dowels 216A-216B, and at least one hook-and-loop material 220.

Figure 2B:
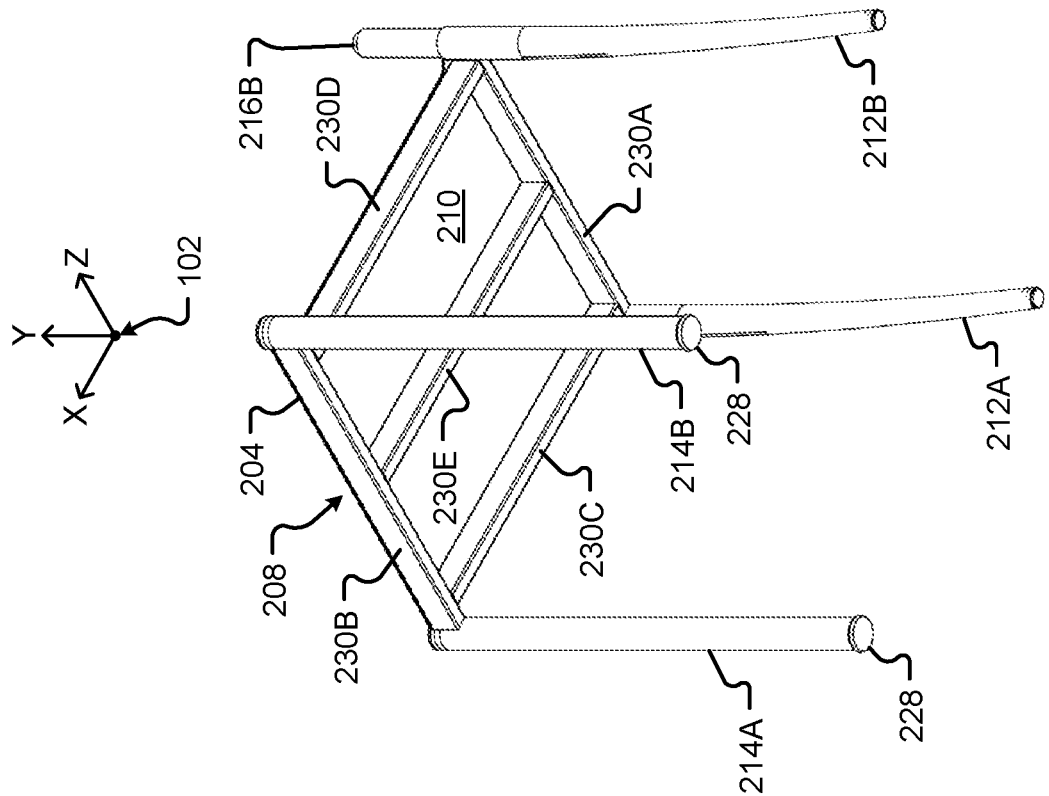
FIG. 2B is a bottom perspective view of the modular seat base frame of the configurable stacking chair in accordance with embodiments of the present disclosure.
Figure 2A:
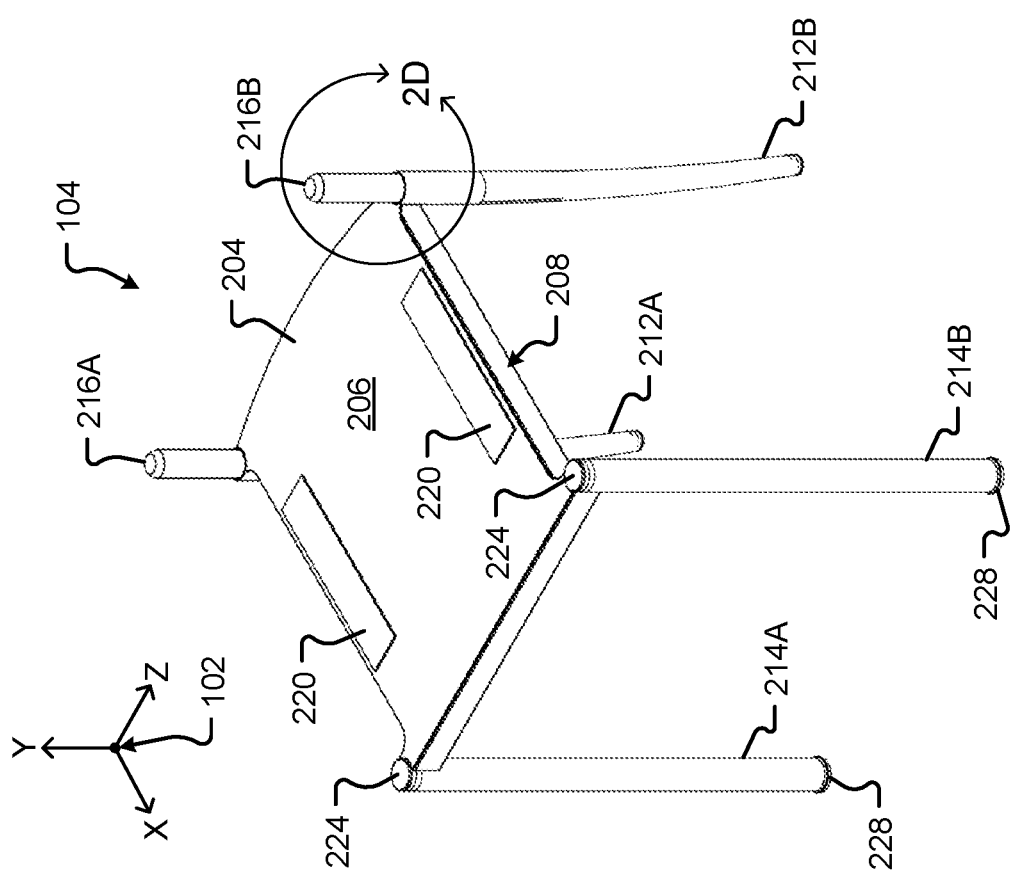
FIG. 2A is a top perspective view of the modular seat base frame of the configurable stacking chair in accordance with embodiments of the present disclosure.

Referring to FIG. 2A, a top perspective view of the modular seat base frame 104 of the configurable stacking chair 100 is shown in accordance with embodiments of the present disclosure. The seat platform 204 of the modular seat base frame 104 may be configured as a flat plate extending a width (e.g., in the Z-axis direction) and length (e.g., extending in the X-axis direction). The seat platform 204 may have a first surface 206 and a second surface 210 disposed opposite the first surface 206. This offset may define a distance, or dimension, that corresponds to a thickness of the seat platform 204. The seat platform 204 may serve as a support for the detachable seat cushion 112. One or more strips of a first hook-and-loop material 220 may be attached to the first surface 206 of the seat platform 204. In one embodiment, the first hook-and-loop material 220 may correspond to the "loop" material in the hook-and-loop material. By arranging the first hook-and-loop material 220 as the "loop" material, the configurable stacking chair 100, when stacked, may prevent damage from occurring to the "hook" material of the hook-and-loop material connection. Additionally or alternatively, the first hook-and-loop material 220 may be inset from an outer periphery of the seat platform 204 such that, when stacked, the first hook-and-loop material 220 is disposed in between the bars that make up the reinforcement frame 208. In some embodiments, the seat platform 204 may cover a portion of the front legs 214A-214B. For instance, the seat platform 204 may cover the ends of the front legs 214A-214B preventing the need of front end caps 224.

The reinforcement frame 208 may be made as a number of bars welded together and attached (e.g., via one or more welds, etc.) to the seat platform 204. Among other things, when connected together, the seat platform 204 and the reinforcement frame 208 provide a unified structure. This unified structure provides rigidity and strength in the modular seat base frame 104 without requiring diagonal connections between legs, additional braces, or other fastened connections. As can be appreciated, the lean design of the modular seat base frame 104 results in a clean and aesthetically pleasing configurable stacking chair 100. Additionally or alternatively, the design of the modular seat base frame 104 (e.g., having fewer parts than comparable chairs) provides a lightweight and strong configurable stacking chair 100.

One or more of the legs 212A-212B, 214A-214B may comprise a formed or inserted foot 228 disposed at a floor-contact end thereof. As provided above, the upper ends of the front legs 214A-214B may be covered by the seat platform 204 or by a front end cap 224. The front end cap 224 may comprise a welded plate or cap, an insert, and/or a plug. The front end cap 224 may be made from metal, plastic, rubber, recycled material, composite, and/or the like.

The modular seat base frame 104 may comprise one or more quick-connect dowels 216A-216B extending from an end of the rear legs 212A-212B. In one embodiment, the quick-connect dowels 216A-216B may be a formed or machined part of the rear legs 212A-212B. In some embodiments, the quick-connect dowels 216A-216B may be a separate component that is inserted into an end of the quick-connect dowels 216A-216B. In any event, the quick-connect dowels 216A-216B may extend from the end of the rear legs 212A-212B above the first surface 206 in the Y-axis direction.

Figure 2C:
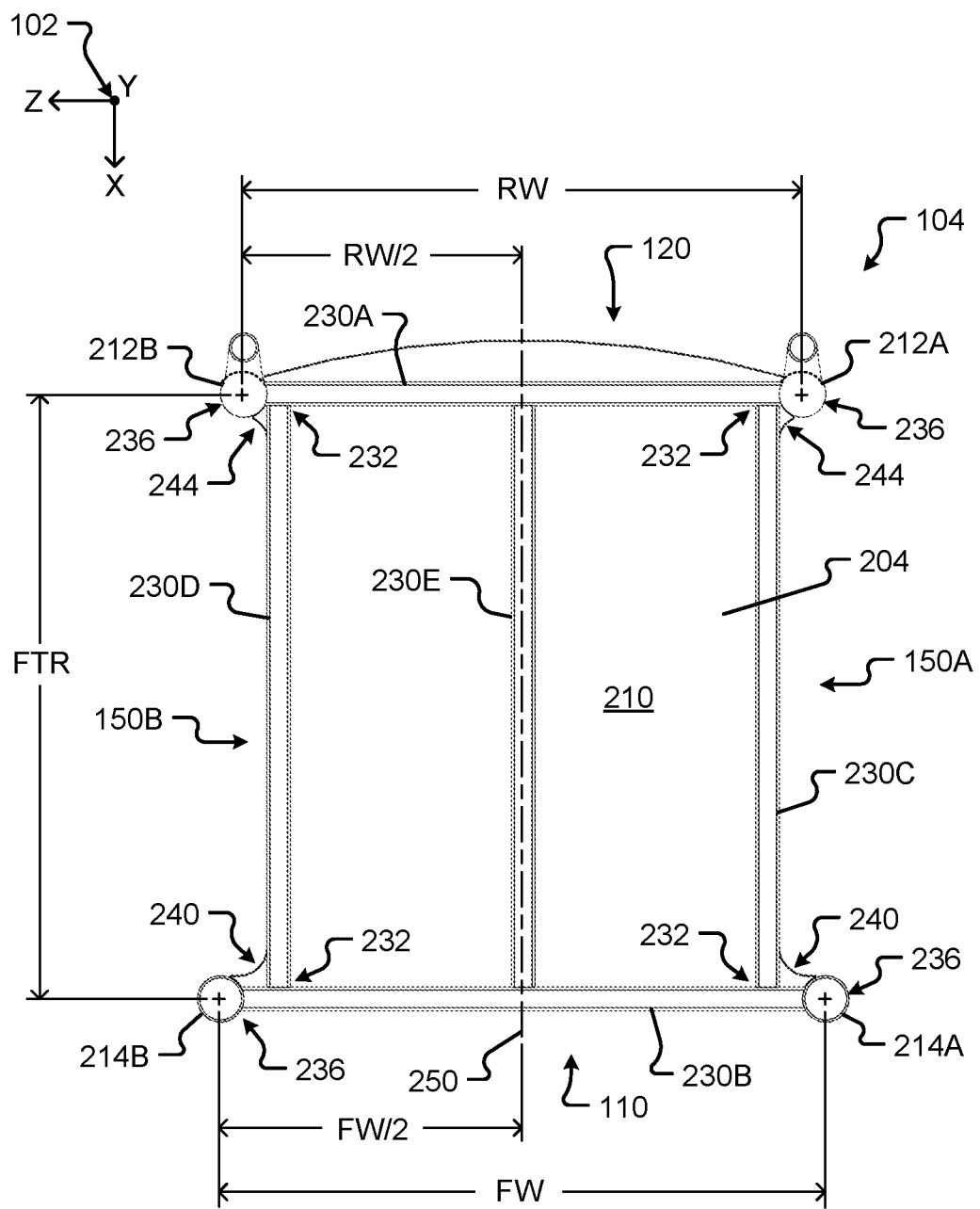
FIG. 2C is a bottom plan view of the modular seat base frame of the configurable stacking chair in accordance with embodiments of the present disclosure.

Referring now to FIGS. 2B and 2C, a bottom of the modular seat base frame 104 and the construction of the reinforcement frame 208 is shown in accordance with embodiments of the present disclosure. The reinforcement frame 208 may be made from a rear bar 230A, a front bar 230B, a first side bar 230C, a second side bar 230D, and a reinforcement bar 230E. In some embodiments, the bars 230A-230E may be welded together to form the reinforcement frame 208. In one embodiment, the rear bar 230A and the front bar 230B may be parallel to and offset from one another (e.g., a distance in the X-axis direction). The first side bar 230C, the second side bar 230D, and/or the reinforcement bar 230E may be arranged orthogonal to the rear bar 230A and/or the front bar 230B. The length of each side bar 230C, 230D and the reinforcement bar 230E may be the same and may define the offset distance between the rear bar 230A and the front bar 230B. In some embodiments, the side bars 230C, 230D may be attached to the rear bar 230A, the front bar 230B, and/or the seat platform 204 at corners 232. For example, a surface of the bars 230A-230E may contact the second surface 210 of the seat platform 204 and be adhered, fastened, and/or welded at points or along at least a portion of the length of each of the bars 230A-230E.

The seat platform 204 may conform to a shape of at least a portion of the reinforcement frame 208. In some embodiments, the seat platform 204 may extend beyond the periphery of the reinforcement frame 208 at one or more front platform fillets 240, rear platform fillets 244, at a front side 110 of the modular seat base frame 104, and/or at a rear side 120 of the modular seat base frame 104.

The rear legs 212A-212B may be attached (e.g., fastened, welded, etc.) to a portion of the reinforcement frame 208 and/or the seat platform 204. For instance, a portion of the outer leg surface 236 of each rear leg 212A-212B may be welded to an end of the rear bar 230A and a portion of the outer leg surface 236 of each front leg 214A-214B may be welded to an end of the front bar 230B. Additionally or alternatively, one or more of the legs 212A-212B, 214A-214B may be welded to at least one of the side bars 230C, 230D.

The rear legs 212A-212B may be separated by a rear width, RW, distance. This rear width, RW, may define a distance from a center axis of an end of the first rear leg 212A to a center axis of an end of the second rear leg 212B, or vice versa. The center axes of the rear legs 212A-212B may lie in a same plane (e.g., in the YZ-plane). The front legs 214A-214B may be separated by a front width, FW, distance. This front width, FW, may define a distance from a center axis of an end of the first front leg 214A to a center axis of an end of the second front leg 214B, or vice versa. The center axes of the front legs 214A-214B may lie in a shared plane (e.g., in the YZ-plane). The rear legs 212A-212B may be separated from the front legs 214A-214B by a front-to-rear, FTR, distance. This distance may be measured from the center axis of the rear legs 212A-212B to the center axis of the front legs 214A-214B.

In some embodiments, the reinforcement bar 230E may be attached to a middle of the rear bar 230A and a middle of the front bar 230B. The middle of the rear bar 230A and front bar 230B may be arranged on a centerline 250 of the modular seat base frame 104 and/or the reinforcement frame 208. Among other things, this arrangement of the reinforcement bar 230E provides a single, and in some cases continuous (e.g., uninterrupted), spanning member from the rear bar 230A to the front bar 230B that supports the center of the seat platform 204.

Figure 2E:
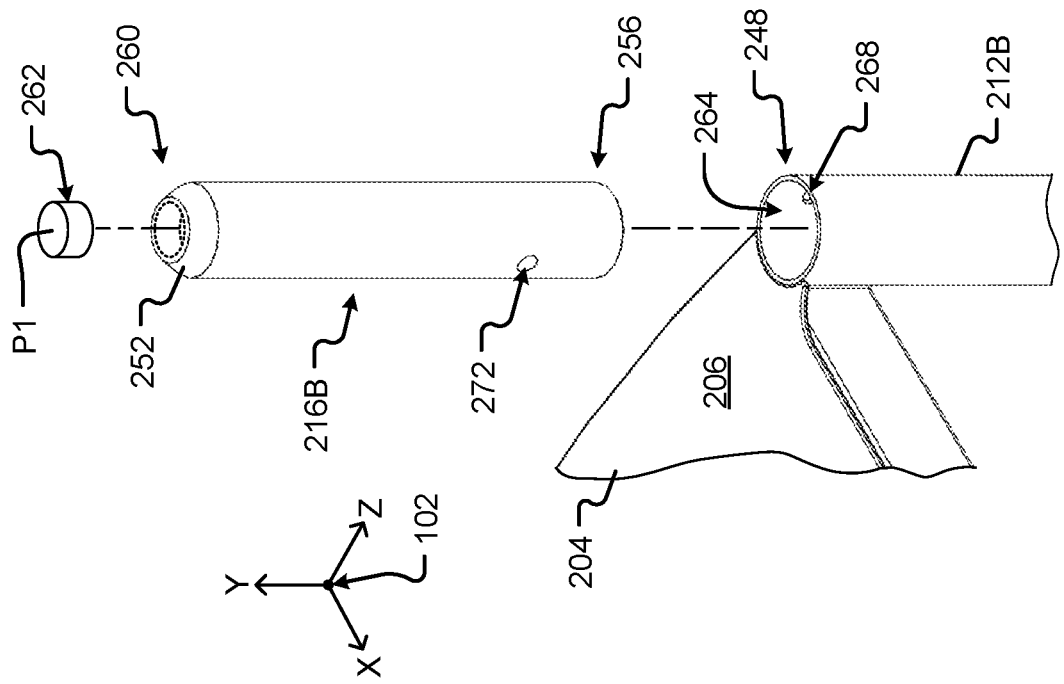
FIG. 2E is an exploded perspective detail view of the quick-connect dowel of the modular seat base frame taken from arrow 2D in accordance with embodiments of the present disclosure.
Figure 2D:
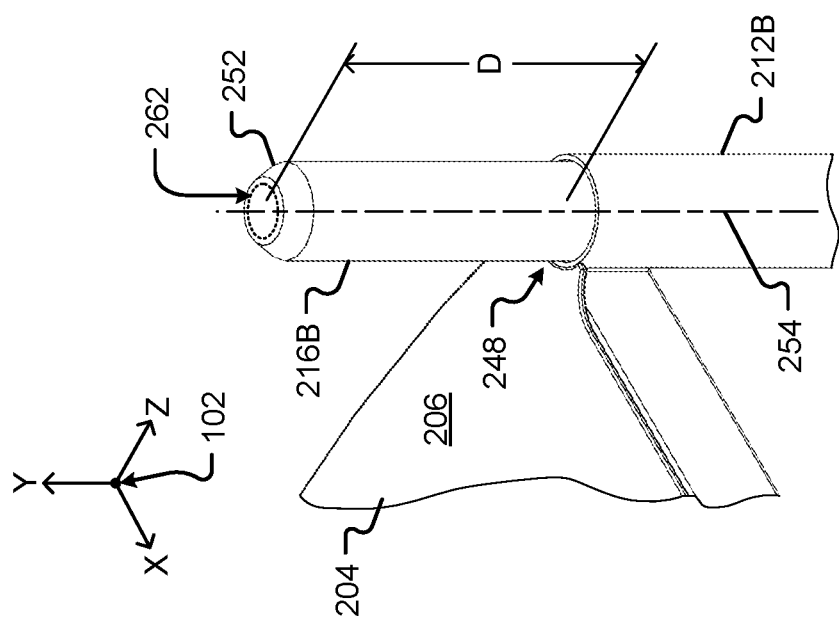
FIG. 2D is a perspective detail view of a quick-connect dowel of the modular seat base frame taken from arrow 2D in accordance with embodiments of the present disclosure.

FIGS. 2D-2E show perspective detail views of a quick-connect dowel 216B of the modular seat base frame 104 in accordance with embodiments of the present disclosure. In particular, the second quick-connect dowel 216B is shown aligned with the leg end 248 of the second rear leg 212B along a leg and dowel axis 254. In some embodiments, the leg and dowel axis 254 may extend along the Y-axis direction. Although described in conjunction with the second quick-connect dowel 216B and the second rear leg 212B, it should be appreciated that the features of the second quick-connect dowel 216B and the second rear leg 212B may be substantially similar, if not identical, to the features of the first quick-connect dowel 216A and the first rear leg 212A, respectively. In some embodiments, the modular seat base frame 104 may comprise two quick-connect dowels 216A-216B having the substantially the same geometry, arrangement, and configuration.

In FIG. 2D, the second quick-connect dowel 216B is shown extending from the leg end 248 of the second rear leg 212B by a distance, D. In one embodiment, this distance, D, may be measured from the first surface 206 of the seat platform 204. The leg end 248 may be oriented flush with the first surface 206 or the second surface 210 of the seat platform 204. The second quick-connect dowel 216B may comprise a tapered surface 252 disposed at one or more ends of the second quick-connect dowel 216B. The tapered surface 252 may correspond to a chamfered, radiused, or broken edge of the second quick-connect dowel 216B. It is an aspect of the present disclosure that the second quick-connect dowel 216B may comprise an optional dowel magnet 262. The dowel magnet 262 is shown having a first end surface that is adjacent to the end surface of the second quick-connect dowel 216B.

FIG. 2E is an exploded perspective detail view of the second quick-connect dowel 216B of the modular seat base frame 104 in accordance with embodiments of the present disclosure. The second quick-connect dowel 216B may be retained in the second rear leg 212B via at least one fastener, press fit, interference fit, slip fit, adhesive, and/or weld. In one embodiment, the second quick-connect dowel 216B may be fastened to the second rear leg 212B via a screw that runs from the outside of the second rear leg 212B through the mount hole 268 and into the dowel mount hole 272. In one embodiment, the mount hole 268 may correspond to a clearance hole, while the dowel mount hole 272 may correspond to a tapped, or threaded, hole. In any event, the first end 256 of the second quick-connect dowel 216B may be inserted into the internal space 264 at the leg end 248 of the second rear leg 212B. The second end 260 may comprise a recess and/or other feature that retains an optional dowel magnet 262. As shown in FIG. 2E, the dowel magnet 262 is arranged to fit in the second end 260 of the second quick-connect dowel 216B such that a surface of the dowel magnet 262 having a first polarity, P1, is facing outwardly from the second end 260 of the second quick-connect dowel 216B. As described herein, the dowel magnet 262 of the second quick-connect dowel 216B may be arranged with a first polarity, P1, facing outwardly toward a magnet of the interchangeable seat back 108 having an opposite second polarity.

In some embodiments, a magnet may be disposed in a portion of the interchangeable seat back 108 and one or more of the quick-connect dowels 216A-216B may comprise a ferrous metal, such as steel, that is attracted (e.g., via magnetism) to the magnet. The steel may comprise a magnetic stainless steel, such as the American Iron and Steel Institute ("AISI") grade 420, 630, Society of Automotive Engineering ("SAE") 17-4 PH, etc., and/or the like. Alternatively, the steel may comprise a magnetic non-stainless type of steel.

Figure 3B:
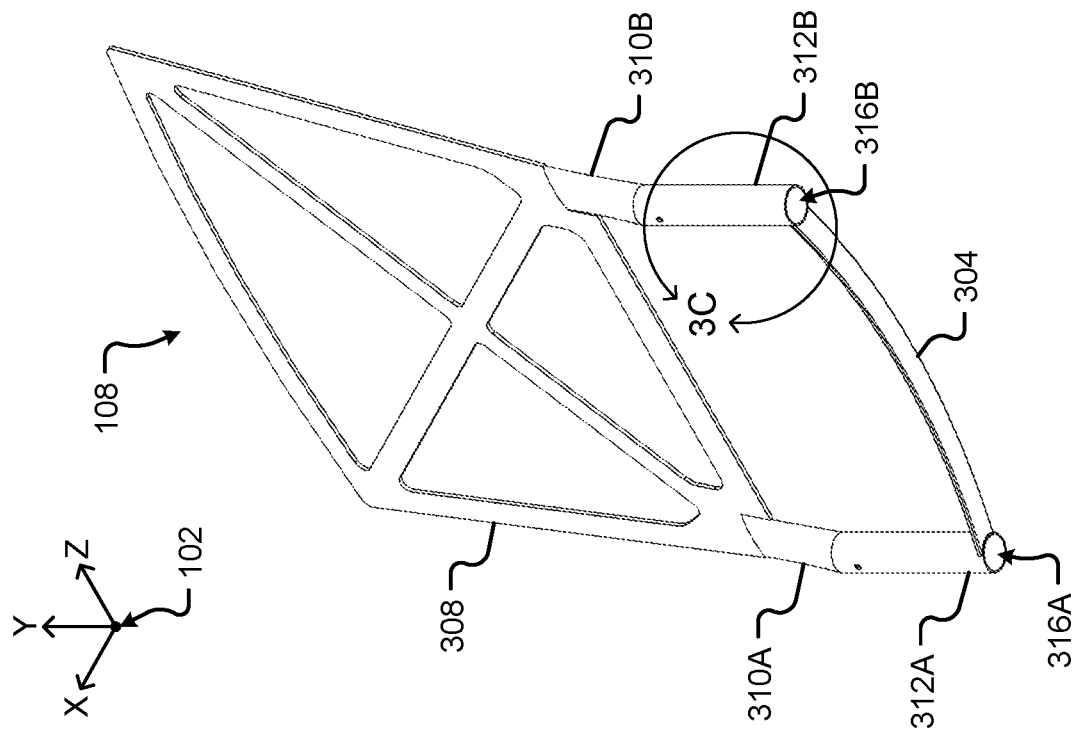
FIG. 3B is a bottom perspective view of the interchangeable seat back of the configurable stacking chair in accordance with embodiments of the present disclosure.
Figure 3A:
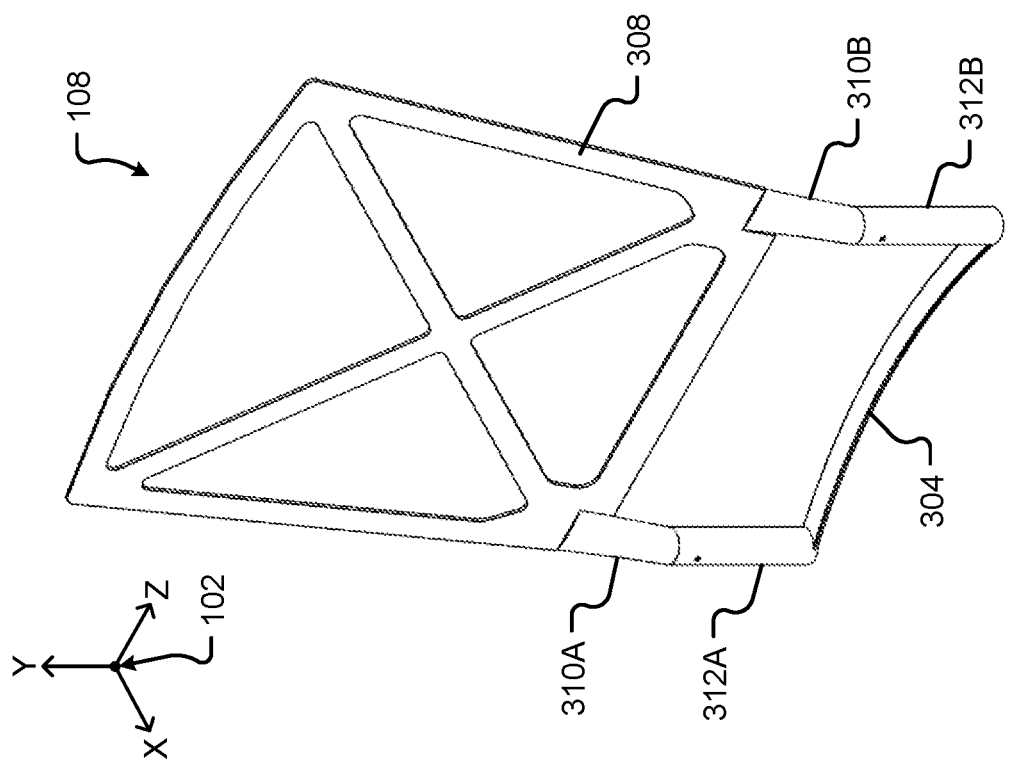
FIG. 3A is a top perspective view of the interchangeable seat back of the configurable stacking chair in accordance with embodiments of the present disclosure.

FIGS. 3A-3B show perspective views of the interchangeable seat back 108 of the configurable stacking chair 100 in accordance with embodiments of the present disclosure. The interchangeable seat back 108 may comprise a spanning bar 304, a back panel 308, one or more transition bars 310A-310B, and one or more dowel engagement tubes 312A-312B interconnected to the back panel 308 (e.g., via the transition bars 310A-310B, etc.). The spanning bar 304 may maintain a distance between the first dowel engagement tube 312A and the second dowel engagement tube 312B. The distance between the center axis of the first dowel engagement tube 312A and the center axis of the second dowel engagement tube 312B may correspond to the rear width, RW, distance.

In the bottom perspective view of FIG. 3B, the internal spaces 316A-316B of the dowel engagement tubes 312A-312B of the interchangeable seat back 108 are shown in accordance with embodiments of the present disclosure. The internal spaces 316A-316B may correspond to an internal cylindrical volume of the dowel engagement tubes 312A-312B, the internal spaces 316A-316B may be sized to accept the quick-connect dowels 216A-216B, respectively. For instance, the inner diameter of the internal spaces 316A-316B may be sized to receive the outer diameter of the quick-connect dowels 216A-216B, respectively. This sizing may be selected to provide a slip fit or other clearance fit that allows the interchangeable seat back 108 to be repeatably and selectively engaged and disengaged from the modular seat base frame 104.

Figure 3D:
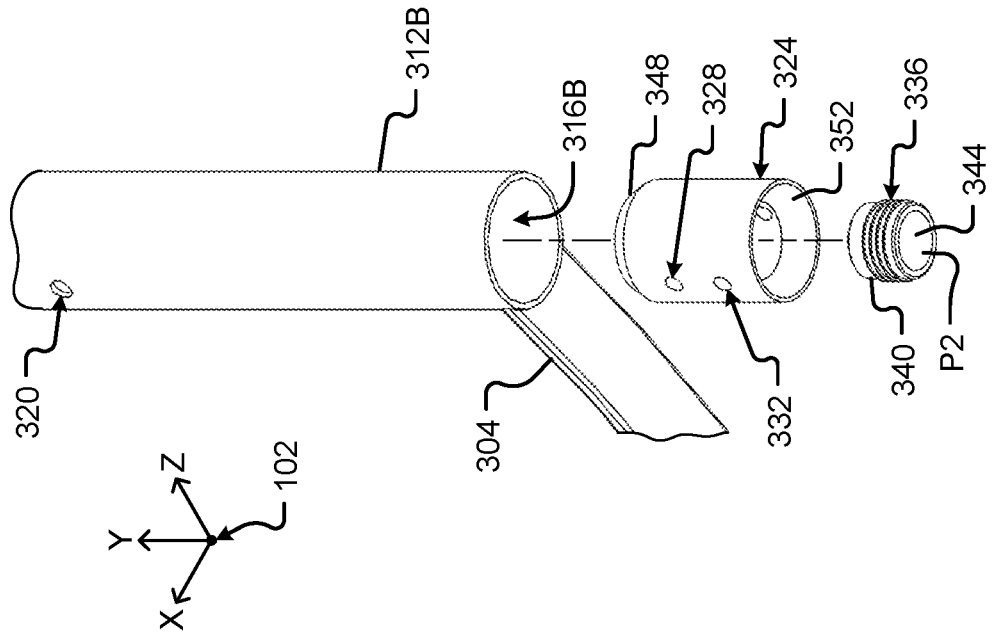
FIG. 3D is an exploded perspective detail view of the dowel engagement tube and magnet of the interchangeable seat back in accordance with embodiments of the present disclosure.
Figure 3C:
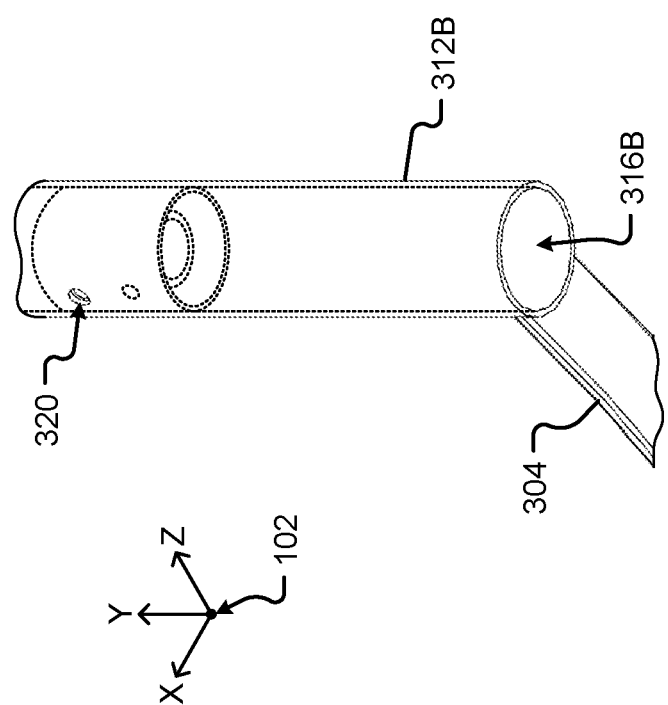
FIG. 3C is a perspective detail view of a dowel engagement tube of the interchangeable seat back taken from arrow 3C in accordance with embodiments of the present disclosure.

FIGS. 3C-3D show perspective detail views of a dowel engagement tube 312B of the interchangeable seat back 108 in accordance with embodiments of the present disclosure. In particular, the second dowel engagement tube 312B and associated components are shown in FIGS. 3C-3D. Although described in conjunction with the second dowel engagement tube 312B, it should be appreciated that the features of the second dowel engagement tube 312B may be substantially similar, if not identical, to the features of the first dowel engagement tube 312A. In some embodiments, the interchangeable seat back 108 may comprise two dowel engagement tubes 312A-312B having the substantially the same geometry, arrangement, and configuration.

FIG. 3C shows a perspective detail view of the second dowel engagement tube 312B of the interchangeable seat back 108 with the cylindrical retainer block 324 shown mounted inside the second internal space 316B in accordance with embodiments of the present disclosure. In this mounted position, the second internal space 316B is configured to receive a portion of the second quick-connect dowel 216B.

In the exploded perspective detail view of FIG. 3D, the cylindrical retainer block 324 and the magnet assembly 336 are shown exposed from the second internal space 316B of the second dowel engagement tube 312B. The cylindrical retainer block 324 may comprise a cylindrical body and a recess to receive a magnet assembly 336. At one end of the cylindrical retainer block 324 an external chamfer 348 may provide a broken edge of the cylindrical body that allows the cylindrical retainer block 324 to be guided into the second internal space 316B during assembly. Once assembled, the cylindrical retainer block 324 may be held in place, relative to the second dowel engagement tube 312B, and/or an end thereof, by a fastener. The fastener (e.g., a screw, bolt, pin, etc.) may be inserted from outside of the second dowel engagement tube 312B through the mount hole 320 and into the retainer block mount hole 328. In some embodiments, the mount hole 320 may be a clearance hole and the retainer block mount hole 328 may be a tapped, or threaded, hole. Additionally or alternatively, the cylindrical retainer block 324 may comprise a magnet assembly retaining feature 332 that retains a magnet assembly 336 inside a recess of the cylindrical retainer block 324.

The cylindrical retainer block 324 may comprise an internal chamfer 352, or tapered surface, that matches (e.g., has the same, or corresponding, angle) as the tapered surface 252 of the second quick-connect dowel 216B. The internal chamfer 352 may correspond to a chamfered, radiused, or otherwise broken internal edge of the cylindrical retainer block 324.

The cylindrical retainer block 324 may comprise a magnet assembly 336. The magnet assembly 336 may include a magnet mount body 340 and a seat back magnet 344 disposed in the magnet mount body 340. The magnet mount body 340 may be at least partially threaded and screwed into the recess of the cylindrical retainer block 324. For example, the recess in the cylindrical retainer block 324 may include internal threads that match a size and pitch of external threads disposed on the magnet mount body 340 of the magnet assembly 336. The magnet assembly 336 may be secured in the recess of the cylindrical retainer block 324 by a set screw inserted in the magnet assembly retaining feature 332 and in contact with the magnet mount body 340 of the magnet assembly 336. In this case, the magnet assembly retaining feature 332 may comprise a threaded hole.

The seat back magnet 344 may be arranged inside the magnet mount body 340 such that a surface of the seat back magnet 344 having a second polarity, P2, is facing outwardly toward an open end of the second dowel engagement tube 312B. As described herein, the seat back magnet 344 may be arranged with a second polarity, P2, facing outwardly toward the dowel magnet 262 of the second quick-connect dowel 216B having the opposite first polarity, P1. This arrangement of the dowel magnet 262 and the seat back magnet 344, having opposing facing polarities may provide enhanced strength in maintaining the interchangeable seat back 108 in a fixed, or engaged, state with the modular seat base frame 104 as opposed to an arrangement where only one magnet is used (e.g., the seat back magnet 344 in contact with a ferrous metal surface of the second quick-connect dowel 216B). The magnets 262, 344 described herein may be any permanent rare earth magnet, samarium-cobalt magnet, neodymium magnet, and/or other magnetized, or magnetizable, material. In some embodiments, the magnets 262, 344 may be covered, painted, coated, or plated (e.g., with a nickel plating, etc.) to protect the magnets 262, 344 from damage and/or corrosion.

FIGS. 4A-4B show various perspective views of the detachable seat cushion 112 in accordance with embodiments of the present disclosure. The detachable seat cushion 112 may comprise a seat base 404, a seat cushion 408 attached to the seat base 404, and one or more coverings (e.g., upholstery, vinyl wrap, leather shroud, etc.). In some embodiments, the detachable seat cushion 112 may comprise one or more strips of hook-and-loop material 420 attached to the contact surface 406 of the seat base 404. The second hook-and-loop material 420 may correspond to a strip of the "hook" material in the hook-and-loop material. By arranging the second hook-and-loop material 420 as the "hook" material, the detachable seat cushions 112, when stacked on top of one another (e.g., such that the second hook-and-loop material 420 of a first detachable seat cushion contacts the upper surface of the seat cushion 408 and/or the covering, etc.), provides a soft surface (e.g., low durometer compared to the surface of the reinforcement frame 208, etc.) and lower pressure applied against the second hook-and-loop material 420. For instance, rather than stacking a hard object (e.g., a rigid object, flat plate, metal, portion of the reinforcement frame 208, or other object harder than the seat cushion 408, etc.) against the second hook-and-loop material 420, the seat cushion 408 provides a softer interface and contact with the second hook-and-loop material 420. As such, the likelihood of damage occurring to the "hook" material of the hook-and-loop material connection during storage, or transport, can be mitigated. This arrangement may increase the usable life of the second hook-and-loop material 420 and the hook-and-loop interface, reduce waste, and/or the postpone the cost of replacement.

The one or more strips of the second hook-and-loop material 420 may be arranged on the contact surface 406 to align with the one or more strips of the first hook-and-loop material 220 disposed on the first surface 206 of the seat platform 204. When aligned, the detachable seat cushion 112 may be lowered into contact with the modular seat base frame 104 and the second hook-and-loop material 420 may contact the first hook-and-loop material 220. In this contact position, the detachable seat cushion 112 may securely attached to the modular seat base frame 104 until the detachable seat cushion 112 is separated with a removal force (e.g., pulling the detachable seat cushion 112 away from the modular seat base frame 104 in the Y-axis direction, etc.). It is an aspect of the present disclosure that the various attachments between the modular seat base frame 104 and the interchangeable seat back 108 as well as between the modular seat base frame 104 and the detachable seat cushion 112 provide a secure and separable attachment without the use of tools, fasteners, or other external connectors.

The detachable seat cushion 112 may have an outer seat base shape 412 comprising at least one portion that contours to, or follows, a shape of the modular seat base frame 104 and/or the interchangeable seat back 108. For instance, the detachable seat cushion 112 may comprise at least one location guide feature 416. These location guide features 416 may comprise indentations that fit around a portion of the quick-connect dowels 216A-216 and/or the dowel engagement tubes 312A-312B. The location guide features 416 may allow an assembly technician to align the detachable seat cushion 112 with the modular seat base frame 104 by orienting the location guide features 416 against the dowel engagement tubes 312A-312B during assembly of the configurable stacking chair 100. Once the location guide features 416 are aligned against, or adjacent, the dowel engagement tubes 312A-312B, the second hook-and-loop material 420 may automatically be aligned with the first hook-and-loop material 220 of the modular seat base frame 104. As can be appreciated, these location guide features 416 and the outer seat base shape 412 can provide a quick assembly of the detachable seat cushion 112 to the modular seat base frame 104. Moreover, this quick assembly allows more configurable stacking chairs 100 to be assembled and deployed in less time (e.g., when compared to conventional stacking chair assembly, etc.).

FIGS. 5A-5D show front elevation views of different interchangeable seat backs 508A-508D in accordance with embodiments of the present disclosure. It is an aspect of the present disclosure that the interchangeable seat back 108 may comprise an optional spanning bar 304, a back panel 308, one or more transition bars 310A-310B, and one or more dowel engagement tubes 312A-312B. While the general configuration of the dowel engagement tubes 312A-312B are similar, if not identical, among all interchangeable seat backs 108, the back panel 308 may be designed having different appearances. As illustrated in FIGS. 5A-5D, all of the interchangeable seat backs 508A-508D comprise dowel engagement tubes 312A-312B having a center-to-center dimension that matches the rear width, RW, of the modular seat base frame 104. This rear width, RW, corresponds to the center-to-center distance between axes of the quick-connect dowels 216A-216B in the modular seat base frame 104. The spanning bar 304 may serve to maintain the dimension between dowel engagement tubes 312A-312B and prevent bending, damage, or misalignment between the interchangeable seat back 108 and the modular seat base frame 104. In some embodiments, the back panel 308 of the interchangeable seat backs 508A-508D may be configured as a flat plate in which various designs, shapes, cutouts, etc., may be formed.

The first interchangeable seat back 508A, shown in FIG. 5A, comprises a flared rectangular outer shape with an "X" pattern disposed in the center of the back panel 308. The second interchangeable seat back 508B, shown in FIG. 5B, comprises a similarly flared rectangular outer shape to the first interchangeable seat back 508A with an "X" pattern disposed in the center of the back panel 308 and a lower arcuate member between the dowel engagement tubes 312A-312B. The third interchangeable seat back 508C, shown in FIG. 5C, comprises an oval, elliptical, or arcuate outer shape with a similarly shaped open center disposed in the back panel 308. The fourth interchangeable seat back 508D, shown in FIG. 5D, comprises a shield-shaped outer shape with a plurality of ornate cutouts disposed in the back panel 308. The designs of the interchangeable seat backs 508A-508D, shown in FIGS. 5A-5D, are provided as non-limiting examples of the shapes and appearances that can be employed by the interchangeable seat back 108 described herein. As can be appreciated, the back panel 308 can be designed with any number of external ornamental shapes, internal cutouts, flourishes, and/or the like to completely change the overall appearance of the configurable stacking chair 100 (e.g., to suit an occasion, event, etc.).

Figure 6:
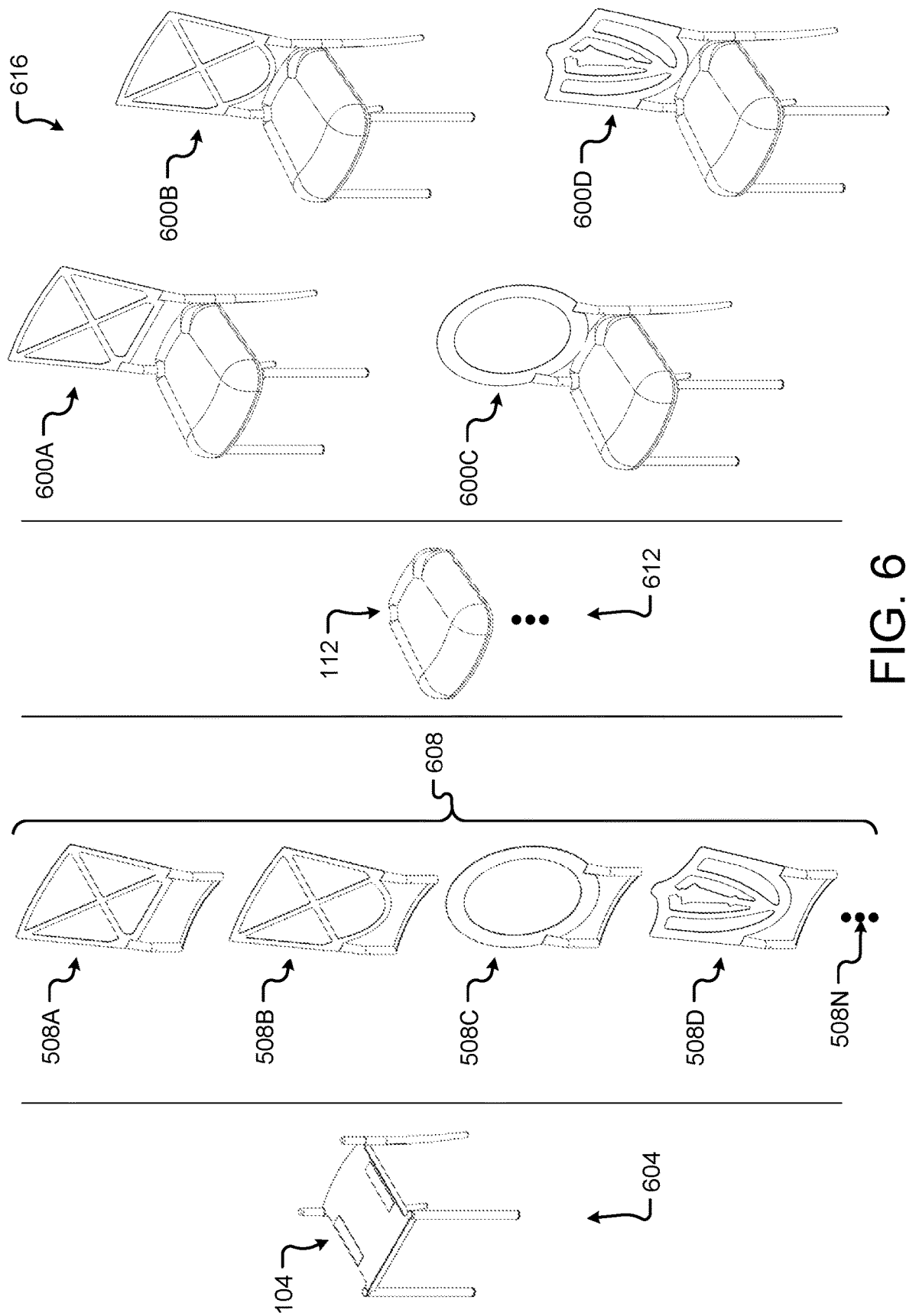
FIG. 6 is block diagram of a method for assembling the configurable stacking chair in accordance with embodiments of the present disclosure.

FIG. 6 is block diagram of a method for assembling a configurable stacking chair 100 in accordance with embodiments of the present disclosure. As provided above, the configurable stacking chair 100 may be assembled from a modular seat base frame 104, a selected interchangeable seat back 108, and a detachable seat cushion 112. In selecting a design, an event planner or organizer can choose a particular interchangeable seat back 108 that suits an event or occasion. The assembly starts with the modular seat base frame 104, or first assembly 604. Next, an interchangeable seat back 508A-508N may be selected from a group of designs to form the second assembly 608. The interchangeable seat backs 508A-508N may comprise more or fewer designs than those shown in FIG. 6. In some embodiments, the third assembly 612 may comprise a selection of a particular detachable seat cushion 112. Although shown as a single example design for the detachable seat cushion 112, it should be appreciated that the detachable seat cushion 112 may include different shapes, colors, coverings, designs, etc., and/or combinations thereof. Once the first assembly 604, the second assembly 608, and the third assembly 612 are assembled, the fourth assembly 616 is formed. As shown in FIG. 6, assembling the modular seat base frame 104, with the selected first interchangeable seat back 508A, and the detachable seat cushion 112 forms the first unified configurable stacking chair 600A. Assembling the modular seat base frame 104, with the selected second interchangeable seat back 508B, and the detachable seat cushion 112 forms the second unified configurable stacking chair 600B. Assembling the modular seat base frame 104, with the selected third interchangeable seat back 508C, and the detachable seat cushion 112 forms the third unified configurable stacking chair 600C. Assembling the modular seat base frame 104, with the selected fourth interchangeable seat back 508D, and the detachable seat cushion 112 forms the fourth unified configurable stacking chair 600D. It is an aspect of the present disclosure that the design of the unified configurable stacking chairs 600A-600D may be changed by removing the selected interchangeable seat back 508A-508D and installing a different selected interchangeable seat back 508A-508N.

Figure 7:
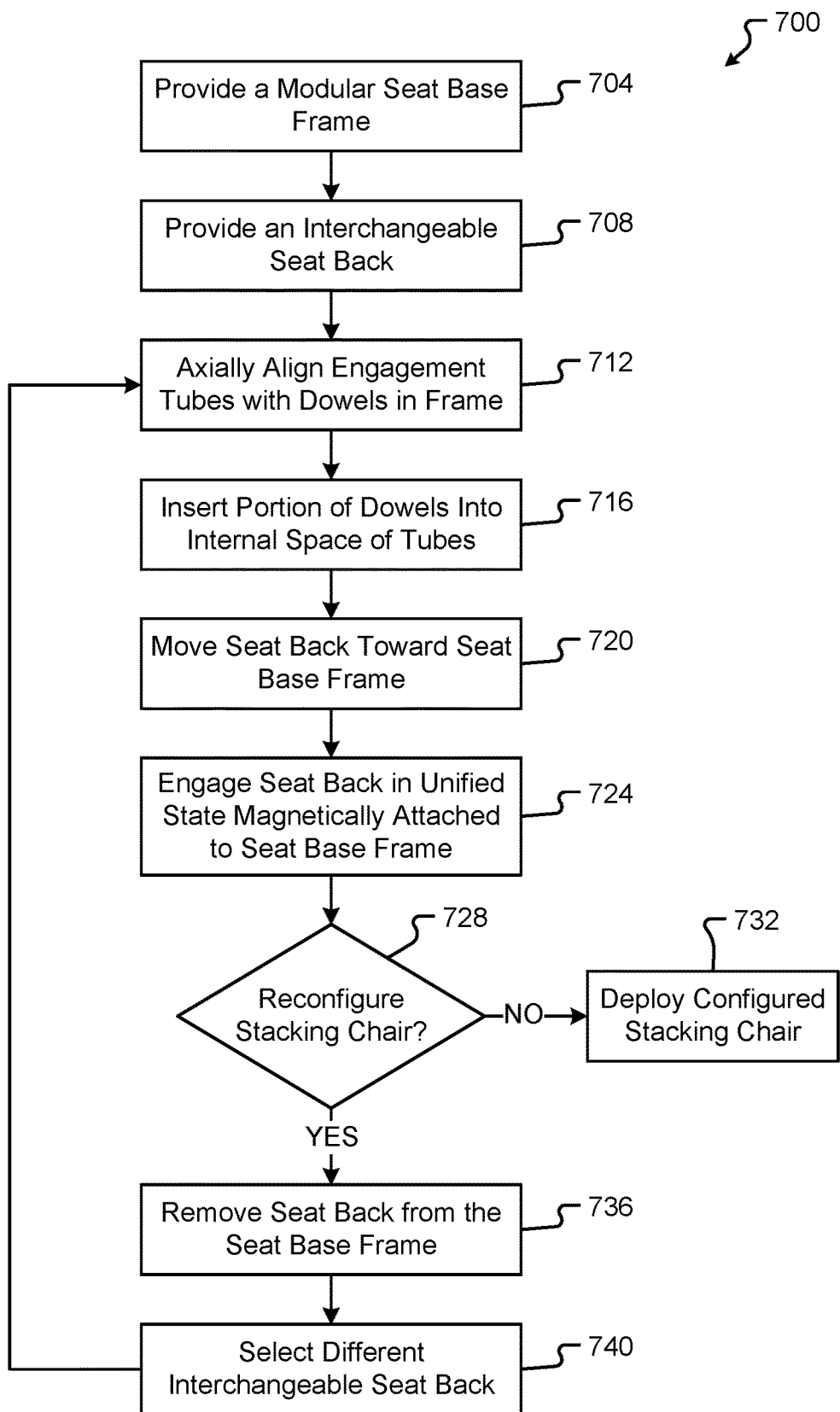
FIG. 7 is a flow diagram describing a method of assembling a configurable stacking chair and optionally reconfiguring an assembled configurable stacking chair in accordance with embodiments of the present disclosure.

FIG. 7 is a flow diagram describing a method 700 of assembling a configurable stacking chair 100 and optionally reconfiguring an assembled configurable stacking chair 100 in accordance with embodiments of the present disclosure. The method 700 begins by providing a modular seat base frame 104 (step 704). The modular seat base frame 104 may be removed from a stack of modular seat base frames 104. When stored, the modular seat base frames 104 may be stacked one on top of one another by arranging the modular seat base frames 104 such that the bottom surface of the reinforcement frame 208 of a first modular seat base frame 104 contacts the first surface 206 of a second modular seat base frame 104, and so on. As the modular seat base frames 104 are stacked, each successive modular seat base frame 104 may be displaced in the Y-axis direction and the X-axis direction.

Next, the method 700 continues by providing a interchangeable seat back 108 (step 708). The interchangeable seat back 108 may be configured with any design of back panel 308 such as, but in no way limited to, the designs of the interchangeable seat backs 508A-508D shown in FIGS. 5A-5D. The interchangeable seat back 108 may be removed from a stack of like interchangeable seat backs 108. During storage or transport, the interchangeable seat backs 108 may be stacked such that a front surface of a first interchangeable seat back 108 contacts the rear surface of an immediately adjacent interchangeable seat back 108 in the stack.

The method 700 continues by assembling the interchangeable seat back 108 to the modular seat base frame 104. Assembling the interchangeable seat back 108 to the modular seat base frame 104 includes axially aligning the dowel engagement tubes 312A-312B of the interchangeable seat back 108 with the quick-connect dowels 216A-216B of the modular seat base frame 104 (step 712). Stated another way, the interchangeable seat back 108 is held above the modular seat base frame 104 and the center axes of the dowel engagement tubes 312A-312B are aligned with the center axes of the quick-connect dowels 216A-216B. Once aligned, the interchangeable seat back 108 may be lowered toward the modular seat base frame 104. The second ends 260 of the quick-connect dowels 216A-216B may then insert into the internal spaces 316A-316B of the dowel engagement tubes 312A-312B (step 716). In some embodiments, the tapered surface 252 of the quick-connect dowels 216A-216B may serve to guide and center the quick-connect dowels 216A-216B inside the internal spaces 316A-316B. After a portion of the second ends 260 are inserted into the internal spaces 316A-316B, the interchangeable seat back 108 may be moved further toward the modular seat base frame 104 (step 720).

The method 700 proceeds by engaging the interchangeable seat back 108 with the modular seat base frame 104 (step 724). This engagement may include moving the interchangeable seat back 108 such that the quick-connect dowels 216A-216B contact a portion of a respective cylindrical retainer block 324 disposed inside the internal spaces 316A-316B. For instance, each cylindrical retainer block 324 may comprise an internal chamfer 352 that contacts and/or guides, the tapered surface 252 of the quick-connect dowels 216A-216B. As provided above, the angle of the internal chamfer 352 may match the angle of the tapered surface 252 of the quick-connect dowels 216A-216B. The contact between the internal chamfers 352 of the dowel engagement tubes 312A-312B and the tapered surfaces 252 of the quick-connect dowels 216A-216B may provide a positive mechanical connection. This connection may prevent wobble of the interchangeable seat back 108 relative to the modular seat base frame 104. The engagement and retention of the interchangeable seat back 108 relative to the modular seat base frame 104 in the Y-axis may be achieved via a magnetic force between the interchangeable seat back 108 and the modular seat base frame 104. For example, the cylindrical retainer block 324 may comprise a seat back magnet 344 that magnetically attracts (e.g., applies a magnetic force, etc.) to a ferrous material of the quick-connect dowels 216A-216B (e.g., steel). In some embodiments, the quick-connect dowels 216A-216B may each comprise a dowel magnet 262 disposed at the second end 260 thereof. In this case, the polarity of the portion of the seat back magnet 344 facing the open end of a respective dowel engagement tube 312A-312B may be arranged to be opposite the polarity of the dowel magnet 262 facing outwardly from the second end 260 of a respective quick-connect dowel 216A-216B. By way of example, the first polarity, P1, (e.g., north or south) of the dowel magnet 262 may be arranged facing outwardly (e.g., in the positive Y-axis direction as shown in FIG. 2E), while the opposite second polarity, P2, (e.g., south or north) of the seat back magnet 344 may be facing outwardly (e.g., in the negative Y-axis direction as shown in FIG. 3D). This arrangement provides an attractive force between the dowel magnet 262 and the seat back magnet 344. In one embodiment, the modular seat base frame 104 may comprise a first quick-connect dowel 216A having a dowel magnet 262 with the first polarity, P1, facing outwardly and a second quick-connect dowel 216B having a dowel magnet 262 with the opposite second polarity, P2, facing outwardly. Continuing this example, the interchangeable seat back 108 may comprise a first dowel engagement tube 312A having a seat back magnet 344 with the second polarity, P2, facing outwardly and a second dowel engagement tube 312B having a seat back magnet 344 with the opposite first polarity, P1, facing outwardly. In this arrangement, the interchangeable seat back 108 may only be assembled in a correct orientation (e.g., where the front surface of the interchangeable seat back 108 faces forward) and is prevented from being assembled in an incorrect, or reverse, orientation. In the correct orientation (e.g., where the first dowel engagement tube 312A is aligned with the first quick-connect dowel 216A, etc.), the dowel magnets 262 and the seat back magnet 344 are attracted to one another. However, in an incorrect orientation (e.g., where the first dowel engagement tube 312A is aligned with the second quick-connect dowel 216B, etc.) the dowel magnets 262 and the seat back magnet 344 are repelled from one another (e.g., like poles repel, opposite poles attract).

In some embodiments, the method 700 may continue by determining to reconfigure the configurable stacking chair 100 (step 728). For instance, the design of an already assembled configurable stacking chair 100 may be changed by swapping the interchangeable seat back 108 for a different interchangeable seat back 108. If no changes are required, the method 700 may continue by deploying the configurable stacking chair 100 (step 732). Deploying the configurable stacking chair 100 may include setting up the configurable stacking chair 100 at an event.

Reconfiguring the configurable stacking chair 100 may comprise removing the interchangeable seat back 108 from the modular seat base frame 104 (step 736). Removing the interchangeable seat back 108 may comprise pulling the interchangeable seat back 108 in a direction (e.g., the positive Y-axis direction) away from the modular seat base frame 104. Additionally or alternatively, the modular seat base frame 104 may be pulled in a direction away from the interchangeable seat back 108 to separate the interchangeable seat back 108 from the configurable stacking chair 100. The pull force required to separate the interchangeable seat back 108 from the modular seat base frame 104 must be greater than the magnetic force between the one or more magnets 262, 344 holding the interchangeable seat back 108 to the modular seat base frame 104. In some embodiments, the magnetic force holding the interchangeable seat back 108 to the modular seat base frame 104 may allow a person to lift the configurable stacking chair 100 by the interchangeable seat back 108 without the interchangeable seat back 108 separating from the modular seat base frame 104. Stated another way, the magnetic force is greater than the weight of the modular seat base frame 104 and any detachable seat cushion 112 attached thereto. It is an aspect of the present disclosure that the interchangeable seat back 108 may be separated without the use of tools.

Once the interchangeable seat back 108 is removed from the modular seat base frame 104, a different interchangeable seat back 108 may be selected (step 740). The different interchangeable seat back 108 may correspond to a different design, color, texture, etc., and/or combinations thereof. The method 700 may continue by returning to step 712 and assembling the selected different interchangeable seat back 108 to the modular seat base frame 104.

After use, the configurable stacking chair 100 may be disassembled by following the steps 712-724 in reverse. For instance, the interchangeable seat back 108 may be disengaged from the modular seat base frame 104, overcoming or breaking the magnetic force attracting the interchangeable seat back 108 to the modular seat base frame 104. Then the interchangeable seat back 108 may be moved away from the modular seat base frame 104 until the quick-connect dowels 216A-216B are no longer inserted in the dowel engagement tubes 312A-312B, respectively. Once separated, the interchangeable seat back 108 may be stacked with other interchangeable seat backs 108 apart from the modular seat base frame 104. Additionally or alternatively, the modular seat base frame 104 may be stacked with other modular seat base frames 104 apart from the interchangeable seat backs 108.

While the flowchart has been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

As should be appreciated by one skilled in the art, aspects of the present disclosure have been illustrated and described herein in any of a number of patentable classes or context including any new and useful process, machine, manufacture, or composition of matter, or any new and useful improvement thereof.

References in the specification to "one embodiment," "an embodiment," "an example embodiment," "some embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in conjunction with one embodiment, it is submitted that the description of such feature, structure, or characteristic may apply to any other embodiment unless so stated and/or except as will be readily apparent to one skilled in the art from the description. The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Exemplary aspects are directed to a configurable stacking chair, comprising: a modular seat base frame comprising: a seat platform comprising a first surface and second surface offset from the first surface, the offset defining a thickness of the seat platform; a reinforcement frame attached to the second surface of the seat platform; two rear legs attached to the reinforcement frame and extending a leg height in a first direction running from the first surface to the second surface, the two rear legs spaced apart from one another by a rear width distance; and a quick-connect dowel comprising a first end inserted into an end of at least one leg of the two rear legs and extending a dowel height in a second direction opposite the first direction, the quick-connect dowel comprising a second end disposed opposite the first end and arranged outside of the end of the at least one leg; and an interchangeable seat back comprising a dowel engagement tube attached to a back panel, wherein the dowel engagement tube comprises an internal space sized to receive the second end of the quick-connect dowel, wherein a magnet is disposed in the internal space offset from an open end of the dowel engagement tube, wherein, without use of tools, the interchangeable seat back engages with the modular seat base frame when the dowel engagement tube is axially aligned with the quick-connect dowel, the second end of the quick-connect dowel is disposed in the open end of the dowel engagement tube, and a magnetic force of the magnet is applied to the quick-connect dowel holding the interchangeable seat back in place, and wherein, without the use of tools, the interchangeable seat back disengages with the modular seat base frame when the interchangeable seat back and the modular seat base frame are pulled apart overcoming the magnetic force of the magnet.

Aspects of the above configurable stacking chair include wherein the magnet is disposed in the internal space such that a first polarity of the magnet is arranged facing the open end of the dowel engagement tube, wherein a dowel magnet is disposed in the second end of the quick-connect dowel, wherein a second polarity of the dowel magnet is arranged facing the open end of the dowel engagement tube, and wherein the second polarity is opposite the first polarity. Aspects of the above configurable stacking chair include wherein the quick-connect dowel comprises a first quick-connect dowel inserted into an end of a first leg of the two rear legs and a second quick-connect dowel inserted into an end of a second leg of the two rear legs, and wherein the dowel engagement tube comprises a first dowel engagement tube and a second dowel engagement tube spaced apart from one another by the rear width distance. Aspects of the above configurable stacking chair further comprise: a detachable seat cushion that selectively attaches to the first surface of the seat platform via hook-and-loop fastening material. Aspects of the above configurable stacking chair include wherein a hook portion of the hook-and-loop fastening material is disposed on a contact surface of the detachable seat cushion, and wherein a loop portion of the hook-and-loop fastening material is disposed on the first surface of the seat platform. Aspects of the above configurable stacking chair include wherein the quick-connect dowel comprises a tapered surface at the second end. Aspects of the above configurable stacking chair include wherein the magnet is held by a cylindrical block inserted in the internal space of the dowel engagement tube, and wherein the cylindrical block comprises an internal chamfer that matches the tapered surface of the quick-connect dowel. Aspects of the above configurable stacking chair include wherein the reinforcement frame comprises: a rear bar; a front bar parallel to and spaced apart a length from the rear bar; a first side bar arranged perpendicular to the front bar and the rear bar, the first side welded to the front bar and the rear bar; and a reinforcement bar arranged perpendicular to the front bar and the rear bar, the reinforcement bar welded to a middle of the front bar and a middle of the rear bar. Aspects of the above configurable stacking chair include wherein the seat platform is welded to the reinforcement frame, and wherein the configurable stacking chair further comprises two front legs attached to the reinforcement frame. Aspects of the above configurable stacking chair include wherein a portion of the seat platform contacts and covers ends of the two front legs, wherein the two front legs are welded to opposing ends of the front bar, and wherein the two rear legs are welded to opposing ends of the rear bar. Aspects of the above configurable stacking chair include wherein the back panel is configured as a flat plate, and wherein the flat plate is formed to have a design and shape. Aspects of the above configurable stacking chair include wherein the quick-connect dowel is fastened to the at least one leg via at least one of a screw, a weld, an interference fit, a press fit, an adhesive, and a clip.

Exemplary aspects are directed to a configurable stacking chair, comprising: a modular seat base frame comprising: a seat platform comprising a first surface and second surface offset from the first surface, the offset defining a thickness of the seat platform; a reinforcement frame attached to the second surface of the seat platform; two rear legs attached to the reinforcement frame and extending a leg height in a first direction running from the first surface to the second surface, the two rear legs spaced apart from one another by a rear width distance, wherein ends of the two rear legs are adjacent to the seat platform; a first quick-connect dowel extending a distance from an end of a first leg of the two rear legs in a second direction opposite the first direction and offset from the first surface of the seat platform; and a second quick-connect dowel extending the distance from an end of a second leg of the two rear legs in the second direction and offset from the first surface of the seat platform; and an interchangeable seat back comprising: a back panel; a first dowel engagement tube attached to the back panel, wherein the first dowel engagement tube comprises a first internal space sized to receive a portion of the first quick-connect dowel, wherein a first magnet is disposed in the first internal space offset from an open end of the first dowel engagement tube; and a second dowel engagement tube attached to the back panel and spaced apart from the first dowel engagement tube by the rear width distance, wherein the second dowel engagement tube comprises a second internal space sized to receive a portion of the second quick-connect dowel, wherein a second magnet is disposed in the second internal space offset from an open end of the second dowel engagement tube; wherein the configurable stacking chair is moveable between a back engaged state and a back disengaged state, wherein, in the back engaged stated, the interchangeable seat back engages with the modular seat base frame when the first and second dowel engagement tubes are axially aligned with the first and second quick-connect dowels, respectively, the portions of the first and second quick-connect dowels are disposed in the first and second dowel engagement tubes, and magnetic force from the first and second magnets are applied to the first and second quick-connect dowels, respectively, holding the interchangeable seat back in place, and wherein, in the back disengaged state, the interchangeable seat back is separated from the modular seat base frame when the interchangeable seat back and the modular seat base frame are pulled apart overcoming the magnetic force of the magnet.

Aspects of the above configurable stacking chair include wherein, in the engaged state, the interchangeable seat back is held in a unified position with the modular seat base frame by the first and second magnets and without any fastener interconnecting the interchangeable seat back to the modular seat base frame. Aspects of the above configurable stacking chair include wherein the first magnet is disposed in the first internal space such that a first polarity of the first magnet is arranged facing the open end of the first dowel engagement tube, wherein a first dowel magnet is disposed in the first quick-connect dowel, wherein a second polarity of the first dowel magnet is arranged facing the open end of the first dowel engagement tube, and wherein the second polarity of the first dowel magnet is opposite the first polarity of the first magnet. Aspects of the above configurable stacking chair include wherein the second magnet is disposed in the second internal space such that a first polarity of the second magnet is arranged facing the open end of the second dowel engagement tube, wherein a second dowel magnet is disposed in the second quick-connect dowel, wherein a second polarity of the second dowel magnet is arranged facing the open end of the second dowel engagement tube, wherein the second polarity of the second dowel magnet is opposite the first polarity of the second magnet, and wherein the first polarity of the first magnet and the first polarity of the second magnet are a same polarity. Aspects of the above configurable stacking chair include wherein the second magnet is disposed in the second internal space such that a first polarity of the second magnet is arranged facing the open end of the second dowel engagement tube, wherein a second dowel magnet is disposed in the second quick-connect dowel, wherein a second polarity of the second dowel magnet is arranged facing the open end of the second dowel engagement tube, wherein the second polarity of the second dowel magnet is opposite the first polarity of the second magnet, and wherein the first polarity of the first magnet and the first polarity of the second magnet are an opposite polarity.

Exemplary aspects are directed to a method of assembling a configurable stacking chair, comprising: providing a modular seat base frame comprising: a seat platform comprising a first surface and second surface offset from the first surface, the offset defining a thickness of the seat platform; a reinforcement frame attached to the second surface of the seat platform; two rear legs attached to the reinforcement frame and extending a leg height in a first direction running from the first surface to the second surface, the two rear legs spaced apart from one another by a rear width distance, wherein ends of the two rear legs are adjacent to the seat platform; a first quick-connect dowel extending a distance from an end of a first leg of the two rear legs in a second direction opposite the first direction and offset from the first surface of the seat platform; and a second quick-connect dowel extending the distance from an end of a second leg of the two rear legs in the second direction and offset from the first surface of the seat platform; providing an interchangeable seat back comprising: a back panel; a first dowel engagement tube attached to the back panel, wherein the first dowel engagement tube comprises a first internal space sized to receive a portion of the first quick-connect dowel, wherein a first magnet is disposed in the first internal space offset from an open end of the first dowel engagement tube; a second dowel engagement tube attached to the back panel and spaced apart from the first dowel engagement tube by the rear width distance, wherein the second dowel engagement tube comprises a second internal space sized to receive a portion of the second quick-connect dowel, wherein a second magnet is disposed in the second internal space offset from an open end of the second dowel engagement tube; aligning, axially, the first and second dowel engagement tubes with the first and second quick-connect dowels, respectively; inserting the portions of the first and second quick-connect dowels into the first and second internal spaces of the first and second dowel engagement tubes, respectively; moving the interchangeable seat back in the first direction such that a majority of the distance of first and second quick-connect dowels are disposed within the first and second internal spaces of the first and second dowel engagement tubes, respectively; and engaging the interchangeable seat back in an unified state forming the configurable stacking chair when a magnetic force provided by the first and second magnets are applied to the first and second quick-connect dowels, respectively.

Aspects of the above method include wherein, in the unified state, the interchangeable seat back is retained to the modular seat base frame by the first and second magnets and without any fastener interconnecting the interchangeable seat back to the modular seat base frame. Aspects of the above method further comprise: removing the interchangeable seat back by moving the interchangeable seat back in the second direction and moving the first and second quick-connect dowels out of a range of the magnetic force provided by the first and second magnets; selecting a different interchangeable seat back to replace the interchangeable seat back removed, the different interchangeable seat back having a different shape and appearance than the interchangeable seat back; aligning, axially, first and second dowel engagement tubes of the different interchangeable seat back with the first and second quick-connect dowels, respectively; inserting the portions of the first and second quick-connect dowels into first and second internal spaces of the first and second dowel engagement tubes of the different interchangeable seat back, respectively; moving the different interchangeable seat back in the first direction such that a majority of the distance of first and second quick-connect dowels are disposed within the first and second internal spaces of the first and second dowel engagement tubes of the different interchangeable seat back, respectively; and engaging the different interchangeable seat back in the unified state forming the configurable stacking chair when a magnetic force provided by first and second magnets disposed in the first and second internal spaces of the first and second dowel engagement tubes of the different interchangeable seat back are applied to the first and second quick-connect dowels, respectively.

Any one or more of the above aspects/embodiments as substantially disclosed herein.

Any one or more of the aspects/embodiments as substantially disclosed herein optionally in combination with any one or more other aspects/embodiments as substantially disclosed herein.

One or means adapted to perform any one or more of the above aspects/embodiments as substantially disclosed herein.

Any one or more of the features disclosed herein.

Any one or more of the features as substantially disclosed herein.

Any one or more of the features as substantially disclosed herein in combination with any one or more other features as substantially disclosed herein.

Any one of the aspects/features/embodiments in combination with any one or more other aspects/features/embodiments.

Use of any one or more of the aspects or features as disclosed herein.

It is to be appreciated that any feature described herein can be claimed in combination with any other feature(s) as described herein, regardless of whether the features come from the same described embodiment.

As used herein, the singular forms "a," "an," and "the" are intended to include the plural forms as well, unless the context clearly indicates otherwise. It will be further understood that the terms "include," "including," "includes," "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B, and C together. When each one of A, B, and C in the above expressions refers to an element, such as X, Y, and Z, or a class of elements, such as X1-Xn, Y1-Ym, and Z1-Zo, the phrase is intended to refer to a single element selected from X, Y, and Z, a combination of elements selected from the same class (e.g., X1 and X2) as well as a combination of elements selected from two or more classes (e.g., Y1 and Zo).

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

It should be understood that every maximum numerical limitation given throughout this disclosure is deemed to include each and every lower numerical limitation as an alternative, as if such lower numerical limitations were expressly written herein. Every minimum numerical limitation given throughout this disclosure is deemed to include each and every higher numerical limitation as an alternative, as if such higher numerical limitations were expressly written herein. Every numerical range given throughout this disclosure is deemed to include each and every narrower numerical range that falls within such broader numerical range, as if such narrower numerical ranges were all expressly written herein.

What is claimed is:

1. A configurable stacking chair, comprising:
    a modular seat base frame, comprising:
        a seat platform comprising a first surface and second surface offset from the first surface, the offset defining a thickness of the seat platform;
        a first rear leg comprising a first end coupled to the seat platform adjacent a first width side of the modular seat base frame, the first rear leg extending a leg height from the first end of the first rear leg to a first foot of the first rear leg, the first rear leg comprising a first internal space extending into the first rear leg at the first end of the first rear leg; and
        a second rear leg comprising a second end coupled to the seat platform adjacent a second width side of the modular seat base frame, the second rear leg extending the leg height from the second end of the second rear leg to a second foot of the second rear leg, the second rear leg comprising a second internal space extending into the second rear leg at the second end of the second rear leg, wherein the second rear leg is spaced apart from the first rear leg by a rear width distance;
    an interchangeable seat back, comprising:
        a back panel;
        a first dowel engagement tube attached to the back panel adjacent a first width side of the interchangeable seat back, wherein the first dowel engagement tube comprises a body extending a tube length to a first open end of the first dowel engagement tube, wherein the first dowel engagement tube comprises a first dowel internal space extending from the first open end into the body of the first dowel engagement tube;
        a second dowel engagement tube attached to the back panel adjacent a second width side of the interchangeable seat back, wherein the second dowel engagement tube is spaced apart from the first dowel engagement tube by the rear width distance, wherein the second dowel engagement tube comprises a body extending the tube length to a second open end of the second dowel engagement tube, wherein the second dowel engagement tube comprises a second dowel internal space extending from the second open end into the body of the second dowel engagement tube; and a spanning bar interconnected with the first dowel engagement tube at the first open end and interconnected with the second dowel engagement tube at the second open end, and wherein the spanning bar maintains the rear width distance between the first dowel engagement tube and the first dowel engagement tube; and at least one quick-connect dowel comprising a dowel body extending a dowel length from a first end of the at least one quick-connect dowel to a second end of the at least one quick-connect dowel;

wherein, without use of tools, the interchangeable seat back mechanically and magnetically engages with the modular seat base frame when the first dowel engagement tube is axially aligned with the first rear leg, the second dowel engagement tube is axially aligned with the second rear leg, and the first end of the at least one quick-connect dowel is engaged with the first internal space and the second end of the at least one quick-connect dowel is engaged with the first dowel internal space, and a magnetic force holds the interchangeable seat back in a unified position with the modular seat base frame, and wherein, without the use of tools, the interchangeable seat back mechanically and magnetically disengages with the modular seat base frame when the interchangeable seat back and the modular seat base frame are pulled apart from one another overcoming the magnetic force.

2. The configurable stacking chair of claim 1, wherein the at least one quick-connect dowel comprises a first quick-connect dowel and a second quick-connect dowel, wherein a first portion of the first quick-connect dowel is disposed in the first internal space, and wherein a first portion of the second quick-connect dowel is disposed in the second internal space.

3. The configurable stacking chair of claim 2, wherein a second portion of the first quick-connect dowel is disposed in the first dowel internal space when the interchangeable seat back mechanically and magnetically engages with the modular seat base frame, and wherein a second portion of the second quick-connect dowel is disposed in the second dowel internal space when the interchangeable seat back mechanically and magnetically engages with the modular seat base frame.

4. The configurable stacking chair of claim 1, wherein the magnetic force is provided by a magnet disposed in a portion of the interchangeable seat back.

5. The configurable stacking chair of claim 4, wherein the at least one quick-connect dowel comprises a metal comprising a ferrous material.

6. The configurable stacking chair of claim 4, wherein the at least one quick-connect dowel comprises a dowel magnet, and wherein the magnetic force is provided by a magnetic attraction between the magnet disposed in the portion of the interchangeable seat back and the dowel magnet.

7. The configurable stacking chair of claim 4, wherein the magnet comprises a first magnet affixed within the first dowel internal space and a second magnet affixed within the second dowel internal space.

8. The configurable stacking chair of claim 1, wherein the first dowel engagement tube is attached to the back panel via a first transition bar extending from the back panel to the first dowel engagement tube, and wherein the second dowel engagement tube is attached to the back panel via a second transition bar extending from the back panel to the second dowel engagement tube.

9. The configurable stacking chair of claim 8, further comprising:
a reinforcement frame attached to the second surface of the seat platform, wherein the first rear leg and the second rear leg are welded to the reinforcement frame.

10. The configurable stacking chair of claim 9, further comprising:
a first front leg attached to the reinforcement frame adjacent the first width side of the modular seat base frame; and
a second front leg attached to the reinforcement frame adjacent the second width side of the modular seat base frame, wherein the first front leg and the second front leg are separated from one another by a front width distance.

11. The configurable stacking chair of claim 1, wherein the back panel is configured as a plate, and wherein the plate is formed comprising a first design and first shape.

12. A configurable stacking chair, comprising:
a modular seat base frame comprising:
a seat platform comprising a first surface and second surface offset from the first surface, the offset defining a thickness of the seat platform;
a reinforcement frame attached to the second surface of the seat platform;
two rear legs attached to the reinforcement frame and extending a leg height in a first direction running from the first surface to the second surface, the two rear legs spaced apart from one another by a rear width distance, wherein ends of the two rear legs are arranged adjacent to the seat platform;
a first quick-connect dowel extending a distance from an end of a first leg of the two rear legs in a second direction opposite the first direction and offset from the first surface of the seat platform; and
a second quick-connect dowel extending the distance from an end of a second leg of the two rear legs in the second direction and offset from the first surface of the seat platform; and
an interchangeable seat back comprising:
a back panel;
a first dowel engagement tube attached to the back panel, wherein the first dowel engagement tube comprises a first internal space sized to receive a portion of the first quick-connect dowel, wherein a first magnet is disposed in the first internal space offset from an open end of the first dowel engagement tube;
a second dowel engagement tube attached to the back panel and spaced apart from the first dowel engagement tube by the rear width distance, wherein the second dowel engagement tube comprises a second internal space sized to receive a portion of the second quick-connect dowel, wherein a second magnet is disposed in the second internal space offset from an open end of the second dowel engagement tube; and a spanning bar interconnected with the first dowel engagement tube at the open end of the first dowel engagement tube and interconnected with the second dowel engagement tube at the open end of the second dowel engagement tube, and wherein the spanning bar maintains the rear width distance between the first dowel engagement tube and the first dowel engagement tube;

wherein the configurable stacking chair is moveable between a back engaged state and a back disengaged state, wherein, in the back engaged state, the interchangeable seat back engages with the modular seat base frame when the first dowel engagement tube and the second dowel engagement tube are axially aligned with the first quick-connect dowel and the second quick-connect dowel, respectively, the portion of the first quick-connect dowel and the portion of the second quick-connect dowel are disposed in the first dowel engagement tube and the second dowel engagement tube, respectively, and magnetic force from the first magnet and magnetic force from the second magnet are applied to the first quick-connect dowel and the second quick-connect dowel, respectively, holding the interchangeable seat back in place, and wherein, in the back disengaged state, the interchangeable seat back is separated from the modular seat base frame when the interchangeable seat back and the modular seat base frame are pulled apart overcoming the magnetic force of the first magnet and the magnetic force of the second magnet.

13. The configurable stacking chair of claim 12, wherein, in the back engaged state, the interchangeable seat back is held in a unified position with the modular seat base frame by the first magnet and the second magnet and without any fastener directly connecting the interchangeable seat back to the modular seat base frame.

14. The configurable stacking chair of claim 12, wherein the first magnet is disposed in the first internal space such that a first polarity of the first magnet is arranged facing the open end of the first dowel engagement tube, wherein a first dowel magnet is disposed in the first quick-connect dowel, wherein a second polarity of the first dowel magnet is arranged facing the open end of the first dowel engagement tube, and wherein the second polarity of the first dowel magnet is opposite the first polarity of the first magnet.

15. The configurable stacking chair of claim 14, wherein the second magnet is disposed in the second internal space such that a first polarity of the second magnet is arranged facing the open end of the second dowel engagement tube, wherein a second dowel magnet is disposed in the second quick-connect dowel, wherein a second polarity of the second dowel magnet is arranged facing the open end of the second dowel engagement tube, wherein the second polarity of the second dowel magnet is opposite the first polarity of the second magnet, and wherein the first polarity of the first magnet and the first polarity of the second magnet are a same polarity.

16. The configurable stacking chair of claim 14, wherein the second magnet is disposed in the second internal space such that a first polarity of the second magnet is arranged facing the open end of the second dowel engagement tube, wherein a second dowel magnet is disposed in the second quick-connect dowel, wherein a second polarity of the second dowel magnet is arranged facing the open end of the second dowel engagement tube, wherein the second polarity of the second dowel magnet is opposite the first polarity of the second magnet, and wherein the first polarity of the first magnet and the first polarity of the second magnet are an opposite polarity.

17. The configurable stacking chair of claim 12, further comprising:
a detachable seat cushion that selectively attaches to the first surface of the seat platform via a hook-and-loop fastening material.

18. A method of assembling a configurable stacking chair, comprising:
providing a modular seat base frame comprising:
a seat platform comprising a first surface and second surface offset from the first surface, the offset defining a thickness of the seat platform;
two rear legs coupled to the seat platform, the two rear legs extending a leg height, the two rear legs spaced apart from one another by a rear width distance, wherein a first end of a first leg of the two rear legs is arranged adjacent a first width side of the modular seat base frame, and wherein a first end of a second leg of the two rear legs is arranged adjacent a second width side of the modular seat base frame;
a first quick-connect dowel extending a first distance from the first end of the first leg to an end of the first quick-connect dowel that is offset from the first surface of the seat platform and that is offset from the first end of the first leg; and
a second quick-connect dowel extending a second distance from the first end of the second leg to an end of the second quick-connect dowel that is offset from the first surface of the seat platform and that is offset from the first end of the second leg;
providing an interchangeable seat back comprising:
a back panel;
a first dowel engagement tube attached to the back panel adjacent a first width side of the interchangeable seat back, wherein the first dowel engagement tube comprises a body extending a tube length to a first open end of the first dowel engagement tube, wherein the first dowel engagement tube comprises a first dowel internal space extending from the first open end into the body of the first dowel engagement tube;
a second dowel engagement tube attached to the back panel adjacent a second width side of the interchangeable seat back, wherein the second dowel engagement tube is spaced apart from the first dowel engagement tube by the rear width distance, wherein the second dowel engagement tube comprises a body extending the tube length to a second open end of the second dowel engagement tube, wherein the second dowel engagement tube comprises a second dowel internal space extending from the second open end into the body of the second dowel engagement tube; and
a spanning bar interconnected with the first dowel engagement tube at the first open end and interconnected with the second dowel engagement tube at the second open end, and wherein the spanning bar maintains the rear width distance between the first dowel engagement tube and the first dowel engagement tube;
aligning, axially, the first dowel engagement tube and second dowel engagement tube with the first quick-connect dowel and the second quick-connect dowel, respectively;

inserting a portion of the first quick-connect dowel and a portion of the second quick-connect dowel into the first dowel internal space and second dowel internal space of the first dowel engagement tube and the second dowel engagement tube, respectively;

moving the interchangeable seat back in a direction toward the modular seat base frame such that a majority of the first distance of first quick-connect dowel and the second distance of the second quick-connect dowel are disposed within the first dowel internal space and the second dowel internal space, respectively; and engaging, without use of tools, the interchangeable seat back in a unified state forming the configurable stacking chair when a magnetic interface arranged between the interchangeable seat back and the modular seat base frame holds the interchangeable seat back and the modular seat base frame together by a magnetic force.

19. The method of claim 18, wherein, in the unified state, the interchangeable seat back is retained to the modular seat base frame by at least one magnet disposed in a portion of the interchangeable seat back and without any fastener directly connecting the interchangeable seat back to the modular seat base frame.

20. The method of claim 18, further comprising:
removing the interchangeable seat back by moving the interchangeable seat back in a direction away from the modular seat base frame and moving the first quick-connect dowel and second quick-connect dowel out of the first dowel internal space and out of the second dowel internal space, respectively, and out of a range of the magnetic force;

selecting a different interchangeable seat back to replace the interchangeable seat back removed, the different interchangeable seat back having a different shape and appearance than the interchangeable seat back;

aligning, axially, a first dowel engagement tube and a second dowel engagement tube of the different interchangeable seat back with the first quick-connect dowel and the second quick-connect dowel, respectively;

inserting a portion of the first quick-connect dowel and a portion of the second quick-connect dowel into a first dowel internal space of the first dowel engagement tube and a second dowel internal space of the second dowel engagement tube of the different interchangeable seat back, respectively;

moving the different interchangeable seat back in the direction toward the modular seat base frame such that a majority of the first distance of first quick-connect dowel and the second distance of the second quick-connect dowel are disposed within the first dowel internal space of the first dowel engagement tube of the different interchangeable seat back and the second dowel internal space of the second dowel engagement tube of the different interchangeable seat back, respectively; and engaging, without use of tools, the different interchangeable seat back in the unified state forming the configurable stacking chair when a magnetic interface arranged between the different interchangeable seat back and the modular seat base frame holds the different interchangeable seat back and the modular seat base frame together by the magnetic force.

* * * * *